(12) United States Patent
Lian et al.

(10) Patent No.: US 12,040,727 B2
(45) Date of Patent: Jul. 16, 2024

(54) COOPERATIVE CONTROL METHOD FOR ENERGY CONVERSION APPARATUS, STORAGE MEDIUM, AND VEHICLE

(71) Applicant: BYD COMPANY LIMITED, Guangdong (CN)

(72) Inventors: Yubo Lian, Shenzhen (CN); Heping Ling, Shenzhen (CN); Jicheng Li, Shenzhen (CN); Hua Pan, Shenzhen (CN); Li Mou, Shenzhen (CN)

(73) Assignee: BYD COMPANY LIMITED, Guangdong (CN)

( * ) Notice: Subject to any disclaimer, the term of this patent is extended or adjusted under 35 U.S.C. 154(b) by 303 days.

(21) Appl. No.: 17/764,038

(22) PCT Filed: Aug. 18, 2020

(86) PCT No.: PCT/CN2020/109886
§ 371 (c)(1),
(2) Date: Mar. 25, 2022

(87) PCT Pub. No.: WO2021/057340
PCT Pub. Date: Apr. 1, 2021

(65) Prior Publication Data
US 2022/0329184 A1     Oct. 13, 2022

(30) Foreign Application Priority Data
Sep. 25, 2019    (CN) .......................... 201910912731.6

(51) Int. Cl.
*H02M 7/219*     (2006.01)
*B60L 15/20*     (2006.01)
(Continued)

(52) U.S. Cl.
CPC .............. *H02P 21/14* (2013.01); *B60L 58/10* (2019.02)

(58) Field of Classification Search
CPC ............ H02M 7/219; H02M 7/53873; H02M 7/5395; H02M 1/0095; H02M 3/1584;
(Continued)

(56) References Cited

U.S. PATENT DOCUMENTS

| 3,673,379 A * | 6/1972 | Eversull | ................. B60H 1/034 |
| | | | 219/202 |
| 2006/0202582 A1 * | 9/2006 | Umesaki | .................. H02K 3/28 |
| | | | 310/263 |

(Continued)

FOREIGN PATENT DOCUMENTS

| CN | 103419651 A | 12/2013 |
| CN | 103560304 A | 2/2014 |

(Continued)

OTHER PUBLICATIONS

International Search Report and Written Opinion for Application No. PCT/CN2020/109886, mailed on Nov. 19, 2020, 11 pages.

*Primary Examiner* — Gabriel Agared

(57) ABSTRACT

A cooperative control method is disclosed. The cooperative control method includes: acquiring a target heating power, a target driving power, and a target charging and discharging power; acquiring a first heating power of a motor coil according to the target charging and discharging power; acquiring a second heating power of the motor coil according to the target driving power; adjusting a first quadrature axis current and a first direct axis current to a target quadrature axis current and a target direct axis current to cause the difference between the sum of the first heating power and the second heating power and the target heating power to be within the preset range; and acquiring a sampling current value on each phase coil and a motor rotor position, and calculating a duty cycle of each phase bridge arm in a reversible PWM rectifier according to the above information.

17 Claims, 20 Drawing Sheets

(51) Int. Cl.
*B60L 55/00* (2019.01)
*B60L 58/10* (2019.01)
*H02M 1/42* (2007.01)
*H02M 7/797* (2006.01)
*H02P 21/14* (2016.01)
*H02P 29/64* (2016.01)

(58) Field of Classification Search
CPC .... H02M 7/797; H02M 7/53876; H02M 1/42; H02M 3/1552; H02M 1/008; B60L 15/20; B60L 55/00; B60L 58/10; B60L 58/27; B60L 53/11; B60L 2240/545; B60L 2220/54; B60L 2240/429; H02P 21/14; H02P 21/0003; H02P 29/64; H01M 10/615; H01M 10/625
USPC .................................................. 318/400.02
See application file for complete search history.

(56) References Cited

U.S. PATENT DOCUMENTS

| | | | |
|---|---|---|---|
| 2009/0096394 A1* | 4/2009 | Taniguchi | H02M 1/32 318/400.09 |
| 2009/0134700 A1 | 5/2009 | Tanaka et al. | |
| 2012/0000241 A1 | 1/2012 | Furlan | |
| 2012/0200241 A1 | 8/2012 | Kojima et al. | |
| 2013/0049666 A1* | 2/2013 | Osugi | H02P 27/08 903/903 |
| 2015/0274026 A1* | 10/2015 | Rippel | B60L 53/14 318/139 |
| 2015/0295514 A1 | 10/2015 | Yamagami | |
| 2016/0126877 A1* | 5/2016 | Endoh | B62D 5/0409 318/400.08 |

FOREIGN PATENT DOCUMENTS

| | | |
|---|---|---|
| CN | 105490577 A | 4/2016 |
| CN | 105762434 A | 7/2016 |
| CN | 205595426 U | 9/2016 |
| CN | 106785120 A | 5/2017 |
| CN | 107627881 A | 1/2018 |
| CN | 108275026 A | 7/2018 |
| CN | 108306078 A | 7/2018 |
| CN | 109473752 A | 3/2019 |
| CN | 109728382 A | 5/2019 |
| CN | 109789799 A | 5/2019 |
| CN | 109823234 A | 5/2019 |
| CN | 110015202 A | 7/2019 |
| CN | 110116653 A | 8/2019 |
| CN | 110126678 A | 8/2019 |
| JP | 3732828 A1 | 6/2004 |
| JP | 2010-051092 A | 3/2010 |
| JP | 2012-165526 A | 8/2012 |
| WO | 2007007900 A1 | 1/2007 |

* cited by examiner

COOPERATIVE CONTROL METHOD FOR ENERGY CONVERSION APPARATUS, STORAGE MEDIUM, AND VEHICLE

CROSS-REFERENCE TO RELATED APPLICATIONS

This application is a National Phase Application of International Patent Application No. PCT/CN2020/109886, filed on Aug. 18, 2020, which is based on and claims priority to and benefits of Chinese Patent Application No. 201910912731.6, filed on Sep. 25, 2019 and entitled "COOPERATIVE CONTROL METHOD AND APPARATUS FOR ENERGY CONVERSION APPARATUS, STORAGE MEDIUM, AND VEHICLE". The content of all of the above-identified applications is incorporated herein by reference in its entirety.

FIELD

The disclosure relates to the technical field of vehicles, and more specifically, to a cooperative control method and apparatus for an energy conversion apparatus, a storage medium, and a vehicle.

BACKGROUND

With the continuous popularization of electric vehicles, more and more electric vehicles will enter the society and families, bringing great convenience for people to travel. Lithium-ion batteries are usually used as power batteries in the electric vehicles. The general working temperature of the lithium-ion battery ranges from −20° C. to 55° C., and the lithium-ion battery is not allowed to be charged at low temperatures. In related arts, the solution for heating the low temperature battery is to use a PTC heater or a heating wire heater or an engine or a motor to heat a cooling liquid of the battery cooling circuit at the low temperature, and heat the battery core to a predetermined temperature by using the cooling liquid. In addition, when the battery is at a low temperature and in a low battery state, such as an extreme condition of −19° C. and state of charge (SOC)=0, the battery is not allowed to discharge, only small current charging and high power heating and low power charging are allowed. Even heating is performed at a power of 0, and charging is allowed for starting at the power of 0. However, the positive temperature coefficient (PTC) heater is incapable of implementing heating while charging, resulting in a long charging time of the battery.

Based on the above, in related arts, there are problems of an increase in costs and two or three of a charging and discharging process, a heating process, and a torque output process incapable of cooperatively working as a result of heating a power battery by using a heating device at the low temperature.

SUMMARY

An object of the disclosure is to provide a cooperative control method and apparatus for an energy conversion apparatus, a storage medium, and a vehicle, to resolve the problems of an increase in costs and two or three of a charging and discharging process, a heating process, and a torque output process incapable of cooperatively working as a result of heating a power battery by using a heating device at the low temperature.

The disclosure is implemented in the following way. A first aspect of the disclosure provides a cooperative control method for an energy conversion apparatus. The energy conversion apparatus includes a reversible pulse width modulation (PWM) rectifier and a motor coil. The reversible PWM rectifier is connected with the motor coil. A positive electrode end and a negative electrode end of an external battery are respectively connected with a first bus terminal and a second bus terminal of the reversible PWM rectifier. A first end and a second end of an external charging and discharging port are respectively connected with at least one neutral line led out from the motor coil and the second bus terminal of the reversible PWM rectifier.

The cooperative control method includes:
acquiring a target heating power, a target driving power, and a target charging and discharging power;
acquiring, according to the target charging and discharging power, a target charging and discharging current outputted from the external charging and discharging port to the neutral line, and acquiring a first heating power of the motor coil according to the target charging and discharging current;
acquiring, according to the target driving power, a first quadrature axis current and a first direct axis current in a synchronous rotating reference frame based on a motor rotor field orientation, and acquiring a second heating power of the motor coil according to the first quadrature axis current and the first direct axis current;
respectively adjusting the first quadrature axis current and the first direct axis current to a target quadrature axis current and a target direct axis current according to the target driving power, when a difference between a sum of the first heating power and the second heating power and the target heating power is not within a preset range, to cause the difference between the sum of the first heating power and the second heating power and the target heating power to be within the preset range; and
acquiring a sampling current value on each phase coil and a motor rotor position, and calculating a duty cycle of each phase bridge arm in the reversible PWM rectifier according to the target quadrature axis current, the target direct axis current, the target charging and discharging current, the sampling current value on each phase coil, and the motor rotor position.

A second aspect of the disclosure provides a computer-readable storage medium. The computer-readable storage medium stores a computer program. When the computer program is executed by a processor, steps of the method in the first aspect are implemented.

A third aspect of the disclosure provides a cooperative control apparatus for an energy conversion apparatus. The energy conversion apparatus includes a reversible PWM rectifier and a motor coil. The reversible PWM rectifier is connected with the motor coil. A positive electrode end and a negative electrode end of an external battery are respectively connected with a first bus terminal and a second bus terminal of the reversible PWM rectifier. A first end and a second end of an external charging and discharging port are respectively connected with at least one neutral line led out from the motor coil and the second bus terminal of the reversible PWM rectifier.

The cooperative control apparatus includes:
a power acquisition module, configured to acquire a target heating power, a target driving power, and a target charging and discharging power;

a first heating power calculation module, configured to: acquire, according to the target charging and discharging power, a target charging and discharging current outputted by the external charging and discharging port, and acquire a first heating power of the motor coil according to the target charging and discharging current;

a second heating power calculation module, configured to acquire, according to the target driving power, a first quadrature axis current and a first direct axis current in a synchronous rotating reference frame based on a motor rotor field orientation, and acquire a second heating power of the motor coil according to the first quadrature axis current and the first direct axis current;

a target current acquisition module, configured to: respectively adjust the first quadrature axis current and the first direct axis current to a target quadrature axis current and a target direct axis current according to the target driving power, when a difference between a sum of the first heating power and the second heating power and the target heating power is not within a preset range, to cause the difference between the sum of the first heating power and the second heating power and the target heating power to be within the preset range, and respectively set the first quadrature axis current and the first direct axis current as the target quadrature axis current and the target direct axis current, when the difference between the sum of the first heating power and the second heating power and the target heating power is within the preset range; and a duty cycle acquisition module, configured to acquire a sampling current value on each phase coil and a motor rotor position, and calculate a duty cycle of each phase bridge arm in the reversible PWM rectifier according to the target quadrature axis current, the target direct axis current, the target charging and discharging current, the sampling current value on each phase coil, and the motor rotor position.

A fourth aspect of the disclosure provides a vehicle. The vehicle further includes the cooperative control apparatus for an energy conversion apparatus in the third aspect.

The technical effects of the cooperative control method and apparatus for an energy conversion apparatus, the storage medium, and the vehicle are as follows. By using the energy conversion apparatus including the reversible PWM rectifier and the motor coil, when the energy conversion apparatus is connected with the external battery and connected with a power supply device or an electric device by using the charging and discharging port, the target heating power, the target driving power, and the target charging and discharging power are acquired. The first heating power is acquired according to the target charging and discharging power. The first quadrature axis current and the first direct axis current are acquired according to the target driving power. The second heating power of the motor coil is acquired according to the first quadrature axis current and the first direct axis current. The first quadrature axis current and the first direct axis current are adjusted to obtain the target quadrature axis current and the target direct axis current according to the difference between the sum of the first heating power and the second heating power and the target heating power. The duty cycle of each phase bridge arm in the reversible PWM rectifier is calculated according to the target quadrature axis current, the target direct axis current, the target charging and discharging current, the sampling current value on each phase coil, and the motor rotor position. The turn-on and turn-off of a switching device on each phase bridge arm in the reversible PWM rectifier are controlled according to the duty cycle. In this way, currents outputted by the external battery or the power supply device flow through the motor coil to generate heat, so as to heat the cooling liquid flowing through a cooling tube of the motor coil. In addition, a power battery is heated when the cooling liquid flows through the power battery, and an additional power battery heating apparatus can be omitted. Therefore, the costs of the entire apparatus can be reduced, and the charging and discharging of the battery at a low temperature can be guaranteed. Moreover, the cooperative working of two or three of the charging and discharging process, the heating process, and the torque output process is achieved.

Additional aspects and advantages of this application will be given in the following description, some of which will become apparent from the following description or may be learned from practices of this application.

BRIEF DESCRIPTION OF THE DRAWINGS

The foregoing and/or additional aspects and advantages of this application will become apparent and comprehensible in the description of the embodiments made with reference to the following accompanying drawings.

DETAILED DESCRIPTION

Figure 1:
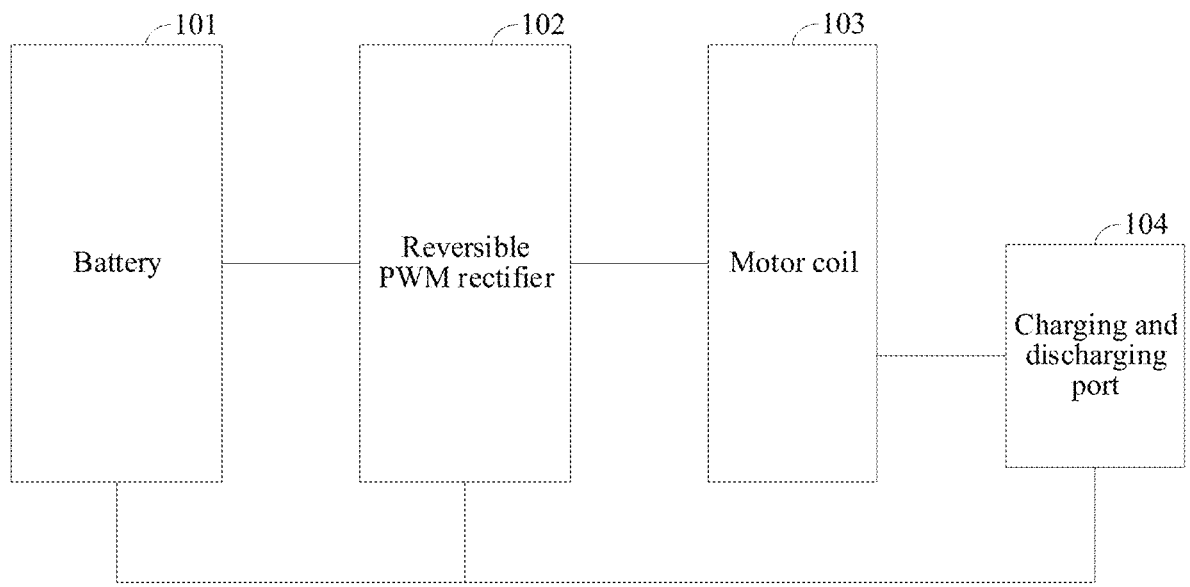
FIG. 1 is a schematic structural diagram of an energy conversion apparatus according to Embodiment I of the disclosure.

Embodiments of this application are described in detail below, and examples of the embodiments are shown in the accompanying drawings, where the same or similar reference numerals throughout the disclosure represent the same or similar elements or the elements having the same or similar functions. The embodiments described below with reference to the accompanying drawings are exemplary, and are intended to explain this application and cannot be construed as a limitation to this application.

To describe the technical solutions in this application, the following will be described by using specific embodiments.

Embodiment I of the disclosure provides a cooperative control method for an energy conversion apparatus. As shown in FIG. 1, the energy conversion apparatus includes a reversible pulse width modulation (PWM) rectifier 102 and a motor coil 103. The reversible PWM rectifier 102 is connected with the motor coil 103. A positive electrode end and a negative electrode end of an external battery 101 are respectively connected with a first bus terminal and a second bus terminal of the reversible PWM rectifier 102. A first end and a second end of an external charging and discharging port 104 are respectively connected with at least one neutral line led out from the motor coil 103 and the second bus terminal of the reversible PWM rectifier 102.

The motor may be a synchronous motor (including a brushless synchronous motor) or an asynchronous motor. A number of phases of the motor coil 103 is greater than or equal to 2. A number of sets of motor windings is greater than or equal to 1 (for example, a dual three-phase motor, a three-phase motor, a six-phase motor, a nine-phase motor, a fifteen-phase motor, and the like). Neutral points are formed by connecting points of the motor coil 103, and neutral lines are led out from the neutral points. There may be one or more led-out neutral lines of the motor coil 103. A specific number of the connecting points of the motor coil 103 depends on a parallel structure of internal windings of the motor. The number of parallel connecting points of the motor coil 103 inside the motor and the number of the neutral lines led out from the neutral point formed by the connecting points are determined by the actual use of the solution. PWM in the reversible PWM rectifier 102 is short for pulse width modulation. The reversible PWM rectifier 102 includes a plurality of phase bridge arms. The plurality of phase bridge arms are connected together to form the first bus terminal and the second bus terminal. The number of the bridge arms are configured according to the number of phases of the motor coil 103. Each phase inverter bridge arm includes two power switch units. The power switch unit may be a device such as a transistor, an insulated gate bipolar transistor (IGBT), a metal-oxide-semiconductor field-effect transistor (MOSFET), a SiC transistor, or the like. The connecting points of the two power switch units in the bridge arm are connected with one of a plurality of phase coils in the motor. The power switch unit in the reversible PWM rectifier 102 may be turned on and off according to an external control signal. The external charging and discharging port 104 is a direct-current (DC) charging and discharging port. The DC charging and discharging port is configured to be connected with a DC power supply device or a DC electric device, and receive a current outputted by the DC power supply device or output the current to the DC electric device. The external battery 101 may be a battery inside a vehicle, for example, a power battery, and the like.

The energy conversion apparatus further includes a controller. The controller is connected with the reversible PWM rectifier 102, and transmits a control signal to the reversible PWM rectifier 102. The controller may include a vehicle controller, a control circuit of the reversible PWM rectifier 102, and a BMS circuit. The vehicle controller, a control circuit the reversible PWM rectifier, and the BMS circuit are connected by using a controller area network (CAN) bus. Different modules in the controller control the turn-on and turn-off of the power switch units in the reversible PWM rectifier 102 according to acquired information to implement the connection of different current circuits. The controller transmits the control signal to the reversible PWM rectifier 102 in the energy conversion apparatus, to cause the current outputted by the external battery 101 or the power supply device connected with the charging and discharging port 104 to flow through the motor coil 103 to generate heat, so as to heat the cooling liquid in a cooling tube flowing through the motor coil 103. In this way, the power battery is heated when the cooling liquid flows through the power battery.

Figure 2:
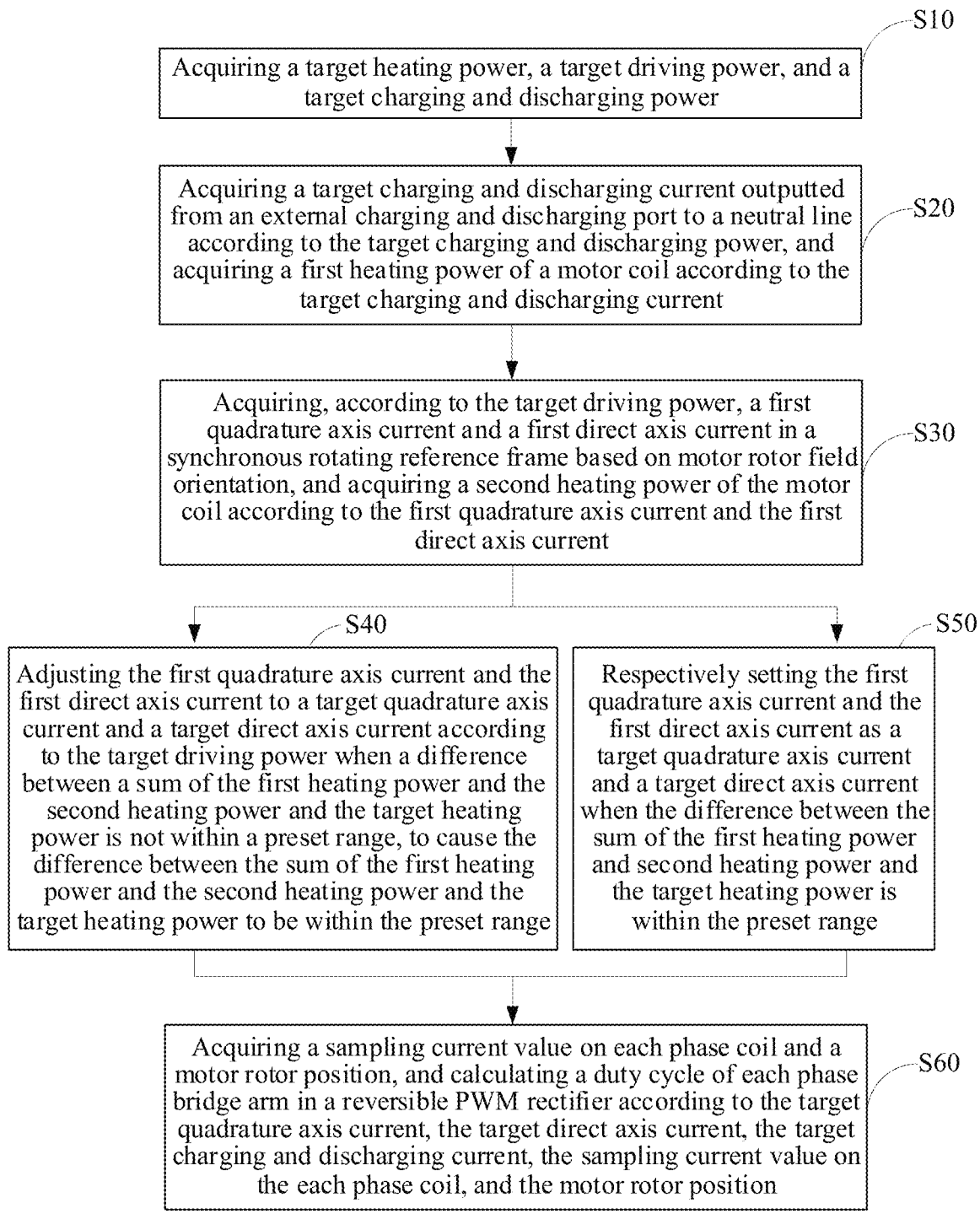
FIG. 2 is a flowchart of a cooperative control method for an energy conversion apparatus according to Embodiment I of the disclosure.

As shown in FIG. 2, the cooperative control method for an energy conversion apparatus includes the following steps.

Step S10: Acquiring a target heating power, a target driving power, and a target charging and discharging power.

In this step, the target heating power is the heat that needs to be generated by the energy conversion apparatus when being charged by the external battery 101 or the power supply device connected with the external charging and discharging port 104 to generate heat by using the motor coil 103. The target driving power is the power generated when the energy conversion apparatus is charged by the external battery 101 or the power supply device connected with the external charging and discharging port 104 to cause the motor to output torque by using the motor coil 103. The target charging and discharging power is the power generated by the external battery 101 discharging the electric device by using the energy conversion apparatus when the external charging and discharging port 104 is connected with the electric device, or the power generated by the power supply device charging the external battery 101 by using the energy conversion apparatus when the external charging and discharging port 104 is connected with the power supply device.

One of the target heating power, the target driving power, and the target charging and discharging power may be zero, and the other two are not zero, or one may not be zero, and the other two are zero, or none of the three are zero.

Step S20: Acquiring a target charging and discharging current outputted from the external charging and discharging port to a neutral line according to the target charging and discharging power, and acquiring a first heating power of the motor coil according to the target charging and discharging current.

In this step, when the external charging and discharging port 104 is connected with an external power supply (for example, the DC power supply device), the target charging and discharging current is calculated according to a charging and discharging mode of the external power supply.

In this step, the target charging and discharging current may also be a current outputted from the external battery 101 to the motor coil 103.

Figure 3:
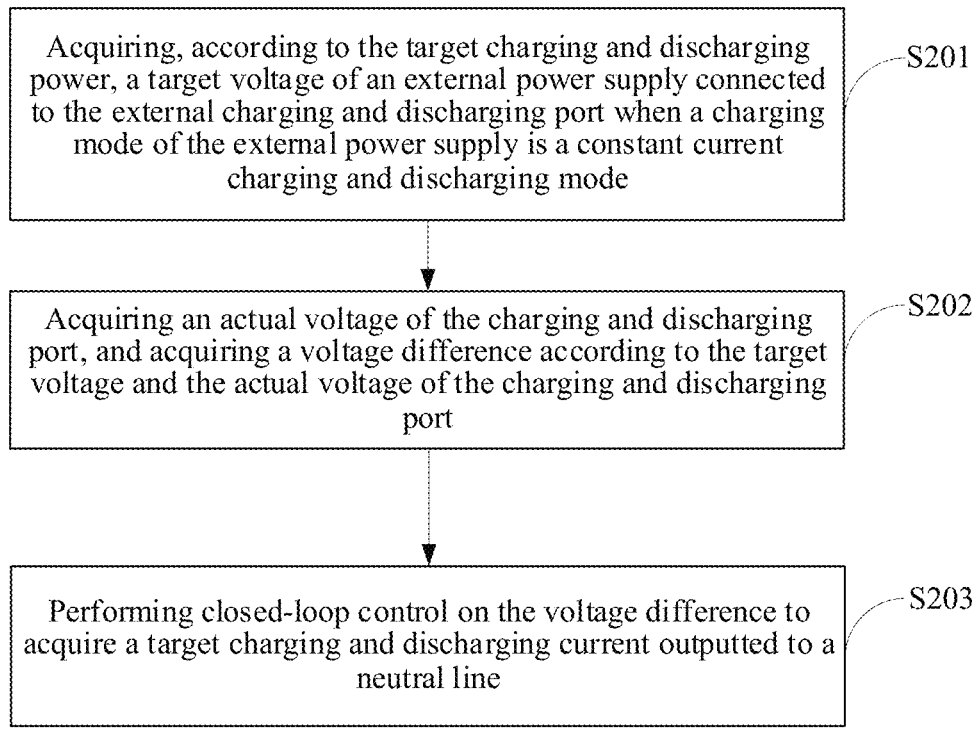
FIG. 3 is a flowchart of step S20 in the cooperative control method for an energy conversion apparatus according to Embodiment I of the disclosure.

In an implementation, as shown in FIG. 3, step S20 of acquiring the target charging and discharging current outputted from the external charging and discharging port to the neutral line according to the target charging and discharging power includes the following steps.

Step S201: Acquiring, according to the target charging and discharging power, a target voltage of an external power supply connected to the external charging and discharging port when a charging and discharging mode of the external power supply is a constant current charging and discharging mode.

In this step, a target voltage U* of the external power supply is acquired according to the target charging and discharging power required by the external battery 101 by using a formula P=U*×I, where I is a charging current of the external power supply.

Step S202: Acquiring an actual voltage of the charging and discharging port, and acquiring a voltage difference according to the target voltage and the actual voltage of the charging and discharging port.

Step S203: Performing closed-loop control on the voltage difference to acquire the target charging and discharging current outputted to the neutral line.

In step S202 and step S203, the actual voltage of the charging and discharging port 104 is collected by using a voltage sensor. A difference between the target voltage and the actual voltage of the charging and discharging port 104 is calculated to acquire a voltage difference, and then the target charging and discharging current is obtained by means of proportional, integral, and differential (PID) control.

In this implementation, when it is detected that the charging and discharging mode of the external power supply is the constant current charging and discharging mode, the target voltage of the external power supply is acquired according to the target charging and discharging power. The target charging and discharging current is calculated according to the target voltage and the actual voltage of the charging and discharging port 104, thereby implementing the acquisition of the target charging and discharging current in the constant current charging and discharging mode.

In another implementation, step S20 of acquiring the target charging and discharging current outputted from the external charging and discharging port to the neutral line according to the target charging and discharging power includes:

acquiring, according to the target charging and discharging power, a current of the external charging and discharging port 104 as the target charging and discharging current outputted from the external charging and discharging port 104 to the neutral line when the external power supply connected to the external charging and discharging port 104 is in a constant voltage charging and discharging mode.

In this step, a charging device outputs a constant voltage U. The target charging and discharging current in* (that is, the current on the neutral line) is calculated according to the target charging and discharging power required for the battery by using a formula P=U×in*.

In an implementation, step S20 of acquiring the first heating power of the motor coil according to the target charging and discharging current includes:

calculating the first heating power of the motor coil according to the following formula:

$$P1 = mR_{sn}\left(\frac{in^*}{m}\right)^2 \qquad \text{Formula 1}$$

where m is the number of phases of the motor coil 103, $R_{sn}$ is a phase resistance of each phase winding branch connected with the neutral line, and in* is the target charging and discharging current. In this implementation, the phase resistance of each phase winding branch connected with the neutral line is the same.

Step S30: Acquiring, according to the target driving power, a first quadrature axis current and a first direct axis current in a synchronous rotating reference frame based on a motor rotor field orientation, and acquiring a second heating power of the motor coil according to the first quadrature axis current and the first direct axis current.

Figure 4:
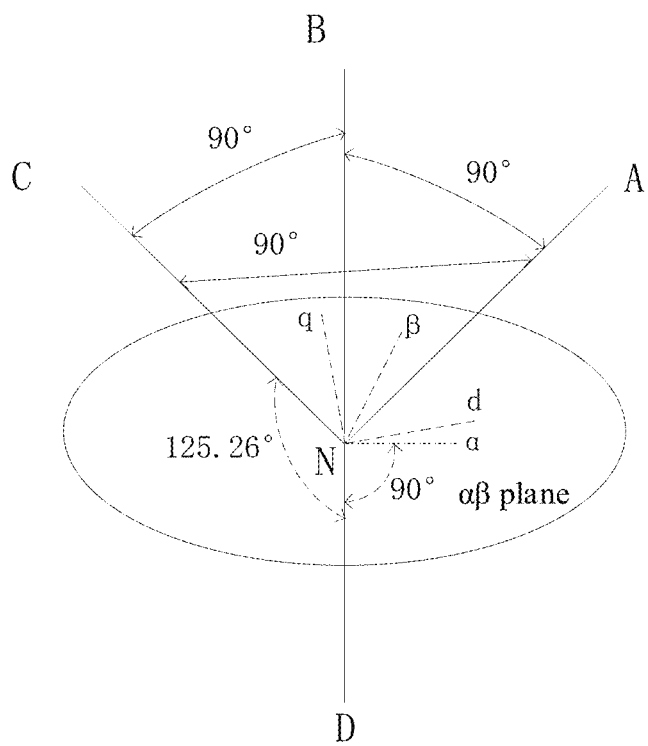
FIG. 4 is a transform diagram of a three-dimensional space in the cooperative control method for an energy conversion apparatus according to Embodiment I of the disclosure.
Figure 5:
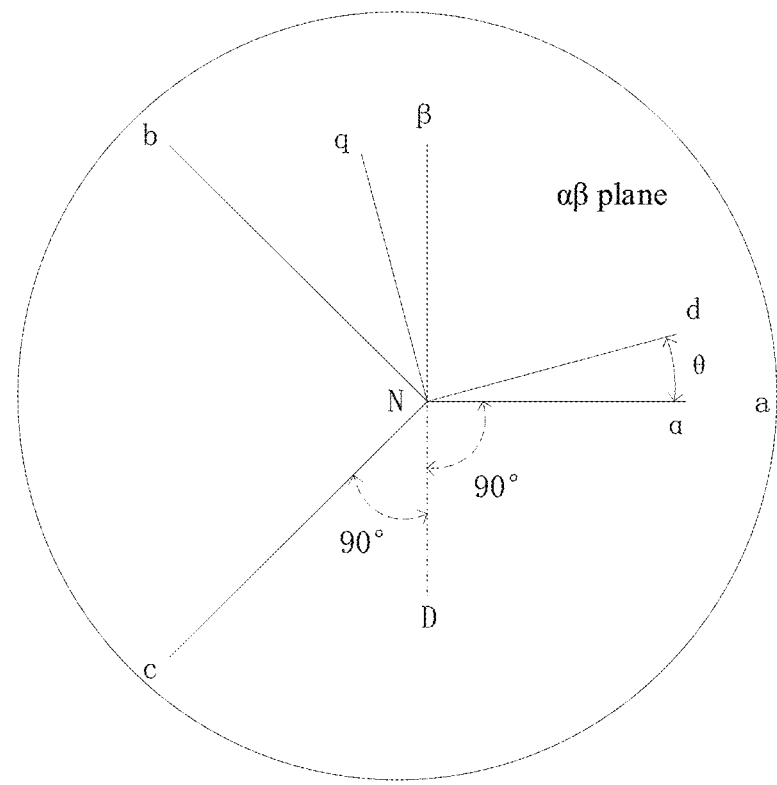
FIG. 5 is a coordinate transformation diagram in the cooperative control method for an energy conversion apparatus according to Embodiment I of the disclosure.

The technical solution of the disclosure includes three reference frames, which are respectively an N-phase axis reference frame of the motor, a stationary reference frame, and the synchronous rotating reference frame based on the motor rotor field orientation. As shown in FIG. 4 and FIG. 5, when the motor is a three-phase motor, the N-phase axis reference frame includes a phase A axis, a phase B axis, and a phase C axis. The phase A axis, the phase B axis, and the phase C axis differ by 90 degrees when being in a three-dimensional state, and differ by 120 degrees after being mapped to the stationary reference frame. The stationary reference frame includes an α axis and a β axis. The synchronous rotating reference frame based on the motor rotor field orientation is a direct-quadrature reference frame (a d-q reference frame). The reference frame synchronously rotates with a rotor. A field direction of the rotor is used as the d axis, and a direction perpendicular to the field direction of the rotor is used as the q axis (the q axis is 90 degrees ahead of the d axis). For ease of the control of the three-phase alternating quantities of the phase A axis, the phase B axis, and the phase C axis, the three-phase alternating quantities of the phase A axis, the phase B axis, and the phase C axis are usually converted to alternating quantities of the α axis and the β axis in the stationary reference frame. Then the alternating quantities of the α axis and the β axis are converted to direct quantities of the d axis and the q axis of the synchronous rotating reference frame. Therefore, the three-phase alternating quantities of the phase A axis, the phase B axis, and the phase C axis can be controlled by controlling the direct quantities of the d axis and the q axis. The transformation among different reference frames may be realized by means of coordinate transformation. The N-phase axis reference frame is transformed into the two-phase stationary reference frame by means of Clark coordinate transform, which generally does not include a zero-axis vector. The two-phase stationary reference frame is transformed into the N-phase axis reference frame by means of inverse Clark transform. The N-phase axis reference frame is transformed into the two-phase stationary reference frame by extending the Clark coordinate transformation, which includes the zero-axis vector. The two-phase stationary reference frame is transformed into the synchronous rotating reference frame by means of Park transformation, which generally does not include the zero-axis vector. The synchronous rotating reference frame is transformed into the two-phase stationary reference frame by means of inverse Park transformation. The two-phase stationary reference frame is transformed into the synchronous rotating reference frame by extending the Park transformation, which includes the zero-axis vector.

In an implementation, step S30 of acquiring the first quadrature axis current and the first direct axis current in the synchronous rotating reference frame based on the motor rotor field orientation according to the target driving power includes:

acquiring a torque output instruction according to the target driving power, and performing table lookup in a predetermined torque graph according to the torque output instruction to acquire the first quadrature axis current and the first direct axis current.

Figure 6:
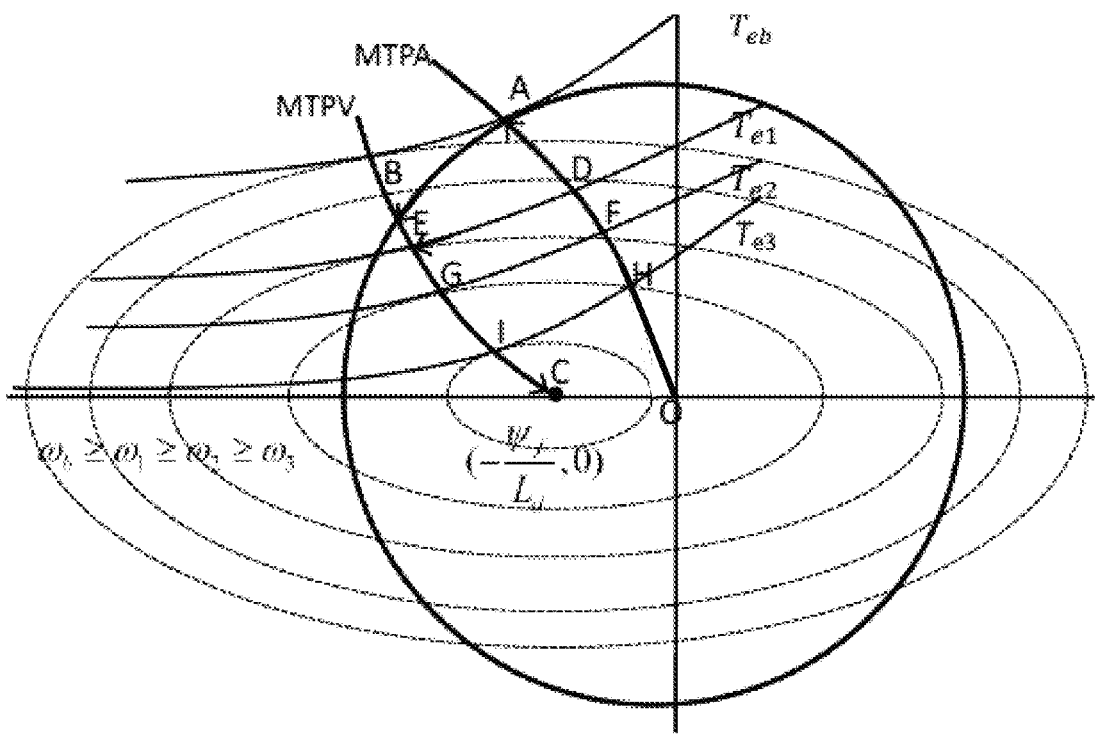
FIG. 6 is a torque graph in the cooperative control method for an energy conversion apparatus according to Embodiment I of the disclosure.

FIG. 6 is a torque graph. A horizontal axis and a longitudinal axis are the direct axis and the quadrature axis respectively, and $T_{e1}$, $T_{e2}$, and $T_{e3}$ are respectively constant torque curves. A dotted line of a voltage ellipse represents a value range of id and iq when a rotational speed ω reaches a certain voltage value. Circles are drawn by using an original point as a center of a circle and resultant current vectors of id and iq as radii to be respectively tangent to the constant torque curves at H, F, D, and A, and then O-H-F-D-A are connected together to obtain a maximum torque per ampere (MTPA) curve. H, F, D, and A correspond to points of minimum values of id and iq on the constant torque curves. By using a point C as a center of a circle, the voltage ellipses are respectively tangent to the constant torque curves at B, E, G, and I, and intersect with the resultant current vectors at A and B. A curve connected by B-E-G-I-C and a circular curve of a maximum current circle between A and B are connected together to obtain a maximum torque per volt (MTPV) curve. The MTPA&MTPV curves and the constant torque curves may be calculated in advance and a bench is calibrated. Generally, a method of table lookup or a combination of the table lookup and interpolation or piecewise linear fitting is used to obtain different control quadrature axis currents and direct axis currents on the MTPA&MTPV curves or the constant torque curves by combining torque Te with the rotational speed w.

For the MTPA curve, electromagnetic torque Te generated during the operation of the motor is controlled by the currents id and iq of the d axis and the q axis, and satisfies the following equations.

$$Te = \frac{m}{2} Pn[\varphi f \times iq + (Ld - Lq) \times id \times iq], \quad \text{Formula 2}$$

where Te is output torque of a shaft end of the motor, m is the number of phases of the motor coil, Pn is the number of pole pairs of the motor, ψf represents a permanent magnet flux linkage of the motor, Ld is a direct axis inductance, Lq is a quadrature axis inductance, id is the direct axis current, and iq is the quadrature axis current.

In the motor, a stator current equation satisfies:

$$i_s^2 = (id^*)^2 + (iq^*)^2 \le i_{s\,max}^2. \quad \text{Formula 3:}$$

Therefore, solving of an MTPA control current is equivalent to solving of an extreme value in the formula 3.

$$\begin{cases} \min is = \sqrt{id^2 + iq^2} \\ Te = \frac{m}{2} Pn[\varphi f \times iq + (Ld - Lq) \times id \times iq] \end{cases} \quad \text{Formula 4}$$

The formula 3 is combined with the formula 4 to solve the MTPA curve, that is, O-H-F-D-A in the torque graph of FIG. 6.

The MTPV curve:

$$\begin{cases} ud = rs \times id + Ld \frac{did}{dt} - \omega e \times Lq \times iq \\ uq = rs \times iq + Lq \frac{diq}{dt} + \omega e(Ld \times id + \varphi f) \end{cases} \quad \text{Formula 5}$$

where we is an electrical angular velocity, rs is a stator winding resistance, Ld and Lq are respectively winding inductances in the d-q reference frame, and ud and uq are respectively voltages in the d-q reference frame.

$$\begin{cases} id^2 + iq^2 = is^2 \le (is_{max})^2 \\ ud^2 + uq^2 \le (us_{max})^2 \\ us_{max} = \frac{Udc}{\sqrt{3}} \end{cases} \quad \text{Formula 6}$$

FIG. 6 is a torque graph. On a current plane, the above formula may be expressed as a current limit circle using a point O (0, 0) as a center of a circle and a voltage limit ellipse using a point C (−ψf/Ld, 0) as a center of a circle. The motor operates it an intersection area of the current limit circle and the voltage limit ellipse. By combining the formula 4 with the formula 5, the MTPV curve is an A-B-E-G-I-C curve in the torque graph of FIG. 6.

In this step, table lookup is performed on the MTPA&MTPV curves in the torque graph according to the torque that needs to be generated by the motor coil 103, to obtain a first direct axis current id1* and a first quadrature axis current iq1* in the synchronous rotating reference frame based on the motor rotor field orientation. The first direct axis current id1* and the first quadrature axis current iq1* may be minimum values in the MTPA&MTPV curves.

In an implementation, step S30 of acquiring the second heating power of the motor coil according to the first quadrature axis current and the first direct axis current includes:

calculating the second heating power of the motor coil according to the following formula.

$$P2 = \frac{m}{2} R_s \left[ (id1^*)^2 + (iq1^*)^2 \right] \quad \text{Formula 7}$$

where m is the number of phases of the motor coil, $R_s$ is a phase resistance of the motor coil, id1* is the first direct axis current, and iq1* is the first quadrature axis current.

Step S40: Adjusting the first quadrature axis current and the first direct axis current to a target quadrature axis current and a target direct axis current according to the target driving power when a difference between a sum of the first heating power and the second heating power and the target heating power is not within a preset range, to cause the difference between the sum of the first heating power and the second heating power and the target heating power to be within the preset range.

In this step, the difference between the sum of the first heating power and the second heating power and the target heating power being not within the preset range means that the sum of the first heating power and the second heating power is greater than a maximum value within the preset range or is less than a minimum value within the preset range. That is to say, when the sum of the first heating power and the second heating power is excessively large or excessively small, the first quadrature axis current and the first direct axis current are adjusted, so as to adjust the second heating power to cause the difference between the sum of the first heating power and the second heating power and the target heating power to be within the preset range. The target heating power, the first heating power, and the second heating power satisfies the following formula:

$$P = P1 + P2 = mR_{sn}\left(\frac{in^*}{m}\right)^2 + \frac{m}{2} R_s \left[ (id1^*)^2 + (iq1^*)^2 \right]. \quad \text{Formula 8}$$

The difference between the sum of the first heating power and the second heating power and the target heating power is calculated to acquire a difference. When the difference is not within the preset range, output torque is acquired according to the target driving power. A constant torque curve corresponding to the output torque is looked up on the torque graph, referring to the constant torque curves Te1, Te2, and Te3 in the torque graph of FIG. 6, where Te1>Te2>Te3. The constant torque curves in the torque graph may be calculated in advance and the bench is calibrated. Generally, a method of table lookup or linear fitting is used to obtain a control current instruction by using the torque. The preset range includes a preset upper limit range and a preset lower limit range. The preset upper limit range includes values greater than zero, and the preset lower limit range includes values less than zero. The target direct axis current id* and the target quadrature axis current iq* that satisfy the torque output instruction are first found by using the MTPA&MTPV curves. The target direct axis current id* and the target quadrature axis current iq* are substituted into the formula 8 to check whether to satisfy a required heating power. When the difference between the sum of the first heating power and the second heating power and the target heating power is less than the preset lower limit range, the values of id and iq slide along the constant torque curve, and move in a direction in which $((id^*)^2+(iq^*)^2)$ increases. The values can move in both a direction in which id* increases toward a positive axis and a direction in which id* decreases toward a negative axis, and preferably move in the direction in which the id* increases toward the positive axis. When the difference between the sum of the first heating power and the second heating power and the target heating power is greater than the preset upper limit range, the values slide along the constant torque curve and move in a direction in which $((id^*)^2+(iq^*)^2)$ decreases, until the difference between the sum of the first heating power and the second heating power and the target heating power is less than the preset upper limit range. If the difference is still greater than the preset upper limit range when the values slide to a minimum point of $((id^*)^2+(iq^*)^2)$ at the current torque and voltage, that is, the target direct axis current point and the target quadrature axis current point that satisfy the torque output instruction on the MTPA&MTPV curves, current points are maintained as the target direct axis current and the target quadrature axis current.

The above iteration is performed until the formula 8 is satisfied or the difference is within an error range specified in the formula 8. The heating power may be calculated in advance and the bench is calibrated. The method of table lookup or linear fitting is used to obtain, by using the heating power, the target direct axis current id* and the target quadrature axis current iq* that satisfy the conditions.

The technical effects of this implementation are that the output torque is acquired according to the target driving power. The constant torque curve is found on the torque graph according to the output torque. A direct axis current and a quadrature axis current are acquired according to the constant torque curve. The second heating power is acquired according to the selected direct axis current and quadrature axis current. Then the direct axis current and the quadrature axis current are adjusted according to a difference between the target heating power and the first heating power and the second heating power, to cause the first heating power and the second heating power to match the target heating power. In this way, the cooperative working between a torque output process, a heating process, and a charging process is achieved.

Further, the cooperative control method further includes:
acquiring a resultant current vector amplitude according to the target quadrature axis current and the target direct axis current that correspond to the first target driving power when the target driving power is converted from a first target driving power to a second target driving power;
acquiring first intersection coordinates and second intersection coordinates formed by a circle having an original point in the predetermined torque graph as a center of a circle and the resultant current vector amplitude as a radius and a torque curve corresponding to the second target driving power;

acquiring a first distance between the first intersection coordinate and a coordinate point formed by the target quadrature axis current and the target direct axis current and a second distance between the second intersection coordinate and the coordinate point formed by the target quadrature axis current and the target direct axis current; and determining intersection coordinates corresponding to a smaller one of the first distance and the second distance as the target direct axis current and the target quadrature axis current of the second target driving power.

In particular, after the target direct axis current id* and the target quadrature axis current iq* that satisfy the conditions are obtained by using the heating power, for example, when the first target driving power is changed to the second target driving power, a current torque output instruction is acquired according to the second target driving power. A point that intersects with a target current circle with a radius of $((id^*)^2+(iq^*)^2)$ is found on a constant torque curve of a current torque value. Current points closest to id* and iq* are used as the target direct axis current id* and the target quadrature axis current iq* of the current torque value. In this way, the cooperative working between the torque output process, the heating process, and the charging process after the output torque is changed is achieved.

Step S50: Respectively setting the first quadrature axis current and the first direct axis current as a target quadrature axis current and a target direct axis current when the difference between the sum of the first heating power and second heating power and the target heating power is within the preset range.

In this step, the first direct axis current id1* and the first quadrature axis current iq1* that satisfy the torque output instruction are acquired by using the MTPA&MTPV curves in the torque graph. The first direct axis current id1* and the first quadrature axis current iq1* are substituted into the formula 8 to check whether to satisfy the required heating power. If the first heating power and the second heating power are within a preset error range of the target heating power, the first quadrature axis current and the first direct axis current are directly set as the target quadrature axis current and the target direct axis current.

Step S60: Acquiring a sampling current value on each phase coil and a motor rotor position, and calculating a duty cycle of each phase bridge arm in the reversible PWM rectifier according to the target quadrature axis current, the target direct axis current, the target charging and discharging current, the sampling current value on each phase coil, and the motor rotor position.

Figure 7:
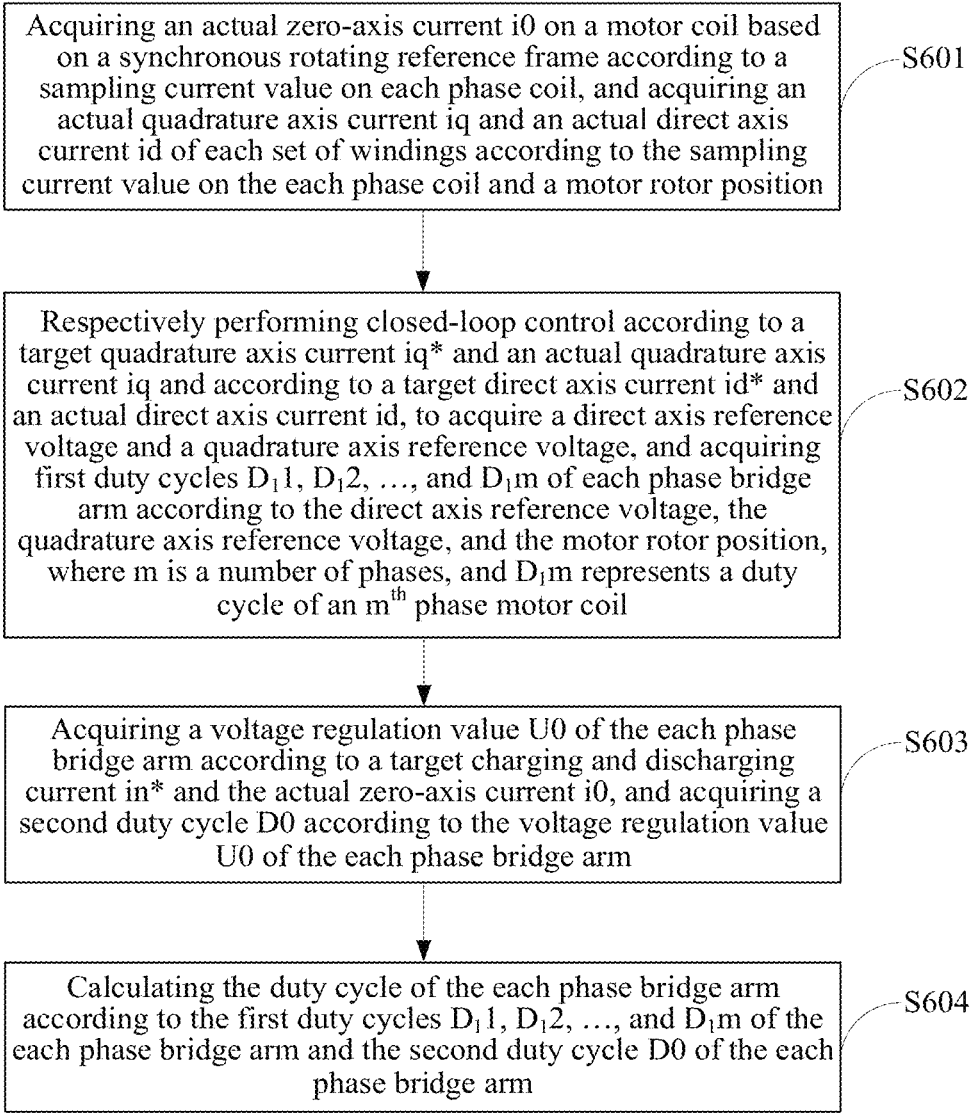
FIG. 7 is a flowchart of step S60 in the cooperative control method for an energy conversion apparatus according to Embodiment I of the disclosure.

In this step, as a first implementation, as shown in FIG. 7, step S60 includes the following step.

Step S601: Acquiring an actual zero-axis current i0 on the motor coil 103 based on a synchronous rotating reference frame according to the sampling current value on each phase coil, and acquiring an actual quadrature axis current iq and an actual direct axis current id of each set of windings according to the sampling current value on each phase coil and the motor rotor position.

In step S601, a zero axis of the motor coil 103 based on the synchronous rotating reference frame is an axis perpendicular to a d-q reference frame of the synchronous rotating reference frame. The actual zero-axis current is a current value obtained by converting the sampling current value on each phase coil to the zero axis.

In an implementation, step S601 of acquiring the actual zero-axis current i0 based on the synchronous rotating reference frame according to the sampling current value on each phase coil includes:

acquiring the actual zero-axis current i0 of the synchronous rotating reference frame according to the following calculation formula:

$$i0 = \frac{ia + ib + \ldots + im}{m},$$

where ia, ib ... im is the sampling current value on each phase coil, and m is the number of motor phases.

The zero-axis current may be regarded as a current possessed by each phase coil. A value of the zero-axis current may be an average value of the sampling current values of all coils. The zero-axis current has a linear relationship with the current on the neutral line.

Figure 8:
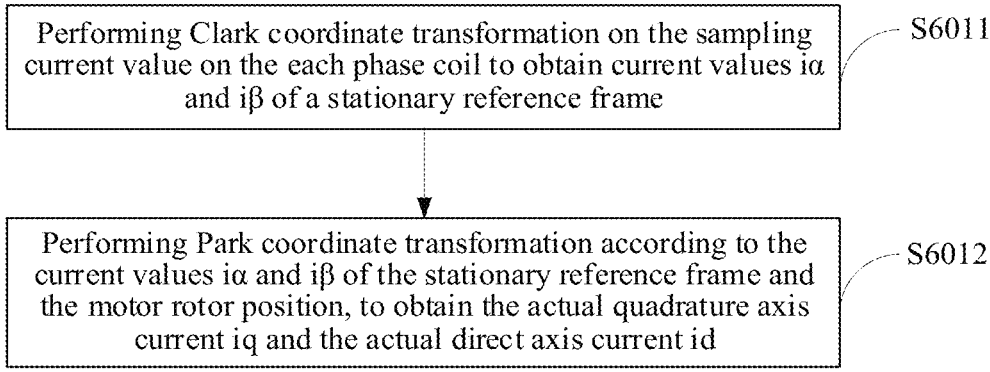
FIG. 8 is a flowchart of step S601 in the cooperative control method for an energy conversion apparatus according to Embodiment I of the disclosure.

In an implementation, as shown in FIG. 8, step S601 of acquiring the actual quadrature axis current iq and the actual direct axis current id according to the sampling current value on each phase coil and the motor rotor position includes the following steps.

Step S6011: Performing Clark coordinate transformation on the sampling current value on each phase coil to obtain current values iα and iβ of a stationary reference frame.

In this step, three phase or a plurality of phase currents on the motor coil 103 are converted two phase currents iα and iβ of the stationary reference frame. The Clark coordinate transformation is usually performed to convert an N-phase axis reference frame to a two-phase stationary reference frame.

An extended Clark (2/m is a constant amplitude Clark, and constant power transformation is similar) coordinate transformation formula of a multiphase motor is as follows:

$$T_{clark} = \frac{2}{m}\begin{bmatrix} 1 & \cos\alpha & \cos 2\alpha & \ldots & \cos[(m-1)\alpha] \\ 0 & \sin\alpha & \sin 2\alpha & \ldots & \sin[(m-1)\alpha] \\ \frac{1}{2} & \frac{1}{2} & \frac{1}{2} & \ldots & \frac{1}{2} \end{bmatrix};$$

An extended inverse Clark (the constant amplitude Clark) coordinate transformation formula of the multiphase motor is as follows:

$$T_{clark}^{-1} = \begin{bmatrix} 1 & 0 & \frac{1}{2} \\ \cos\alpha & \sin\alpha & \frac{1}{2} \\ \cos 2\alpha & \sin 2\alpha & \frac{1}{2} \\ \ldots & \ldots & \ldots \\ \cos[(m-1)\alpha] & \sin[(m-1)\alpha] & \frac{1}{2} \end{bmatrix}$$

where the number of motor phases is m, and α=2π/m, which is an electrical angle by which two adjacent phase windings in each set of windings differ. For example, a three-phase and four-wire motor is used as an embodiment for description, m=3, α=120, and $$i0 = \frac{ia + ib + ic}{3}.$$

Three phase currents of ia, ib, and ic in a three-phase coil are measured, i0 is calculated according to $$i0 = \frac{ia+ib+ic}{3}.$$

The currents (ia, ib, and ic) are converted to current values iα and iβ on the two-phase stationary reference frame by means of Clark (the constant amplitude Clark), where iα=2/3*(ia−ib/2−ic/2), and iβ=(ib−ic)/√3. A Clark coordinate transformation formula is as follows:

$$\begin{bmatrix} i\alpha \\ i\beta \end{bmatrix} = \frac{2}{3} \begin{bmatrix} 1 & -\frac{1}{2} & -\frac{1}{2} \\ 0 & \frac{\sqrt{3}}{2} & -\frac{\sqrt{3}}{2} \end{bmatrix} \begin{bmatrix} ia \\ ib \\ ic \end{bmatrix}.$$

Step S6012: Performing Park coordinate transformation according to the current values iα and iβ of the stationary reference frame and the motor rotor position to obtain the actual quadrature axis current iq and the actual direct axis current id.

In this step, the two phase current values iα and iβ of the stationary reference frame are converted to a quadrature axis current and a direct axis current of the synchronous rotating reference frame based on the motor rotor field orientation. The motor rotor position may be an electrical angle θ between a direct axis of the motor rotor and a phase A winding of the motor coil 103. If an asynchronous motor is used, θ=(a rotor speed Wr+a slip Ws)*t, and θ is obtained by using a rotary transformer or other position sensors or a positionless sensor to read the motor rotor position.

The actual quadrature axis current iq and the actual direct axis current id may be acquired by means of the following Park coordinate transformation:

$$\begin{bmatrix} id \\ iq \end{bmatrix} = \begin{bmatrix} \cos\theta & \sin\theta \\ -\sin\theta & \cos\theta \end{bmatrix} \begin{bmatrix} i\alpha \\ i\beta \end{bmatrix}.$$

Extended Park coordinate transformation:

$$T_{park} = \begin{bmatrix} \cos\theta & \sin\theta & 0 \\ -\sin\theta & \cos\theta & 0 \\ 0 & 0 & 1 \end{bmatrix}$$

Extended inverse Park coordinate transformation:

$$T_{park}^{-1} = \begin{bmatrix} \cos\theta & -\sin\theta & 0 \\ \sin\theta & \cos\theta & 0 \\ 0 & 0 & 1 \end{bmatrix}$$

where θ is the motor rotor position.

Step S602: Respectively performing closed-loop control according to the target quadrature axis current iq* and the actual quadrature axis current iq and according to the target direct axis current id* and the actual direct axis current id to acquire a direct axis reference voltage and a quadrature axis reference voltage, and acquiring a first duty cycle $D_1 1, D_1 2, \ldots,$ and $D_1 m$ of each phase bridge arm according to the direct axis reference voltage, the quadrature axis reference voltage, and the motor rotor position, where m is the number of phases, and $D_1 m$ represents a duty cycle of an $m^{th}$ phase motor coil 103.

Figure 9:
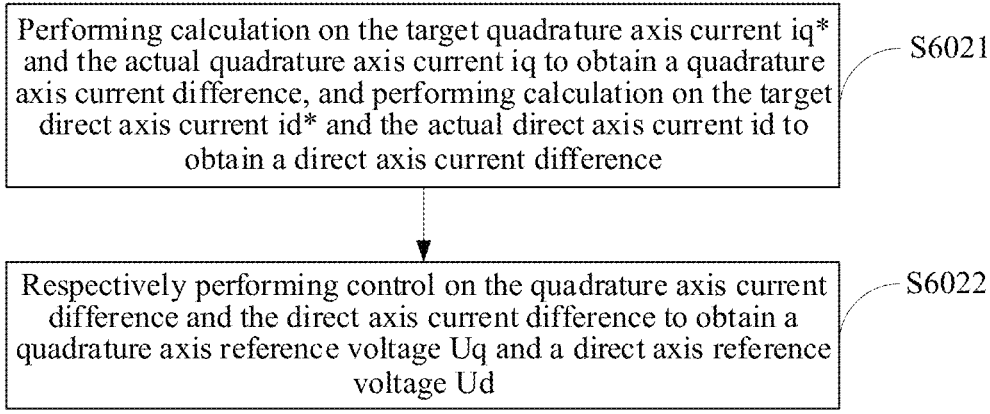
FIG. 9 is a flowchart of step S602 in the cooperative control method for an energy conversion apparatus according to Embodiment I of the disclosure.

In an implementation, as shown in FIG. 9, step S602 of respectively performing closed-loop control according to the target quadrature axis current iq* and the actual quadrature axis current iq and according to the target direct axis current id* and the actual direct axis current id to acquire the direct axis reference voltage and the quadrature axis reference voltage includes the following steps.

Step S6021: Performing calculation on the target quadrature axis current iq* and the actual quadrature axis current iq to obtain a quadrature axis current difference, and performing calculation on the target direct axis current id* and the actual direct axis current id to obtain a direct axis current difference.

Step S6022: Respectively performing control (for example, PID control) on the quadrature axis current difference and the direct axis current difference to obtain a quadrature axis reference voltage Uq and a direct axis reference voltage Ud.

In the above two steps, the quadrature axis reference voltage Uq is obtained by subtracting the actual quadrature axis current iq from the target quadrature axis current iq* and performing control (for example, PID control). Similarly, the direct axis reference voltage Ud is obtained by subtracting the actual direct axis current id from the target direct axis current id* and performing control (for example, PID control).

Figure 10:
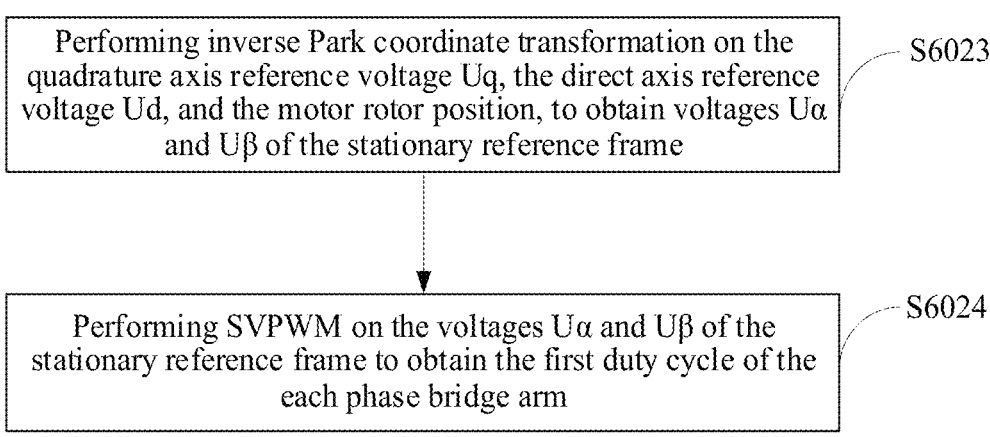
FIG. 10 is another flowchart of step S602 in the cooperative control method for an energy conversion apparatus according to Embodiment I of the disclosure.

In an implementation, as shown in FIG. 10, step S602 of acquiring the first duty cycle $D_1 1, D_1 2, \ldots,$ and $D_1 m$ of each phase bridge arm according to the direct axis reference voltage, the quadrature axis reference voltage, and the motor rotor position includes the following steps.

Step S6023: Performing inverse Park coordinate transformation on the quadrature axis reference voltage Uq, the direct axis reference voltage Ud, and the motor rotor position to obtain voltages Uα and Uβ of the stationary reference frame.

In this step, the voltages Uα and Uβ of the stationary reference frame may be acquired by using the following inverse Park coordinate transformation formula:

$$\begin{bmatrix} U\alpha \\ U\beta \end{bmatrix} = \begin{bmatrix} \cos\theta & -\sin\theta \\ \sin\theta & \cos\theta \end{bmatrix} \begin{bmatrix} Ud \\ Uq \end{bmatrix}.$$

Step S6024: Performing space vector pulse width modulation (SVPWM) transformation on the voltages Uα and Uβ of the stationary reference frame to obtain the first duty cycle of each phase bridge arm.

In this step, an SVPWM algorithm is performed on the voltages Uα and Uβ of the stationary reference frame to obtain the duty cycles $D_1 1, D_1 2, \ldots,$ and $D_1 m$ of the bridge arms in the reversible PWM rectifier 102.

Step S603: Acquiring a voltage regulation value U0 of each phase bridge arm according to the target charging and discharging current in* and the actual zero-axis current i0, and acquiring a second duty cycle D0 according to the voltage regulation value U0 of each phase bridge arm.

Figure 11:
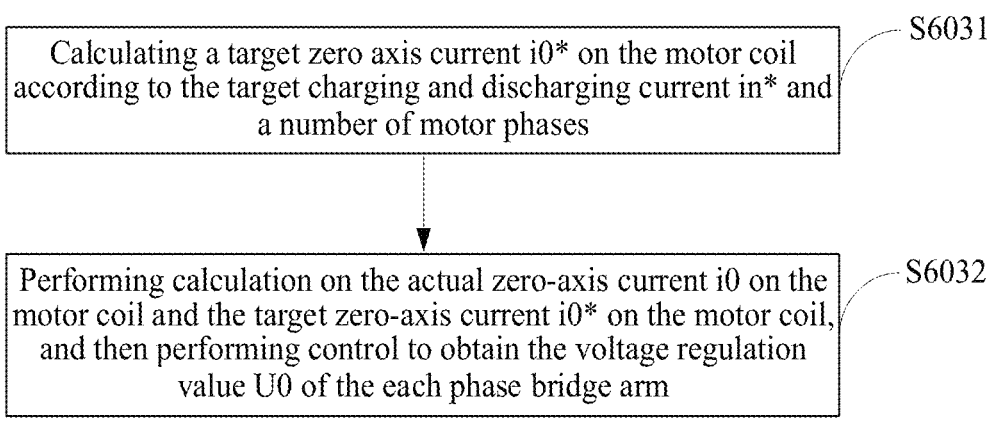
FIG. 11 is a flowchart of step S603 in the cooperative control method for an energy conversion apparatus according to Embodiment I of the disclosure.

In an implementation, as shown in FIG. 11, step S603 of acquiring the voltage regulation value U0 of each phase bridge arm according to the target charging and discharging current in* and the actual zero-axis current i0 on the motor coil 103 includes the following steps.

Step S6031: Performing calculation on a target zero-axis current i0* on the motor coil 103 according to the target charging and discharging current in* and the number of motor phases.

Step S6032: Performing calculation on the actual zero-axis current i0 on the motor coil 103 and the target zero-axis current i0* on the motor coil 103, and performing control (for example, PID control) to obtain the voltage regulation value U0 of each phase bridge arm.

In the above step, there is a proportional relationship between the target charging and discharging current in* and the target zero-axis current i0*. A proportionality coefficient is the number of motor phases. Subtraction is performed on the actual zero-axis current i0 on the motor coil 103 and the target zero-axis current i0* on the motor coil 103 to acquire a current difference, and then control (for example, the PID control) is performed to obtain the voltage regulation value U0 of each phase bridge arm.

In an implementation, step S603 of acquiring the second duty cycle D0 according to the voltage regulation value U0 of each phase bridge arm includes: modulating the voltage regulation value U0 and a bus voltage to obtain the second duty cycle D0.

Step S604: Calculating the duty cycle of the each phase bridge arm according to the first duty cycle D11, D12, ... , and D1m of the each phase bridge arm and the second duty cycle D0 of the each phase bridge arm.

In this step, the duty cycle of each phase bridge arm may be obtained by addition or subtraction between the first duty cycle and the second duty cycle.

A direction in which a charging current flows from the charging and discharging port to the neutral point is used as a positive direction. Directions of a plurality of phase currents are respectively as follows. A direction in which the current flows into a motor phase terminal is a positive direction, and a direction in which the current flows out from the motor phase terminal is a negative direction. When the DC power supply device charges the external battery by using the charging and discharging port, the duty cycle of each phase bridge arm is calculated by subtracting the duty cycle D0 from the first duty cycle of each phase bridge arm.

A first implementation of step S60 includes step S601, step S602, and step S603. In this implementation, a parameter value of the multiphase motor is applied to the synchronous rotating reference frame to perform closed-loop control. In this way, the cooperative working of the heating process, the charging and discharging process, and the torque output process is achieved.

Figure 12:
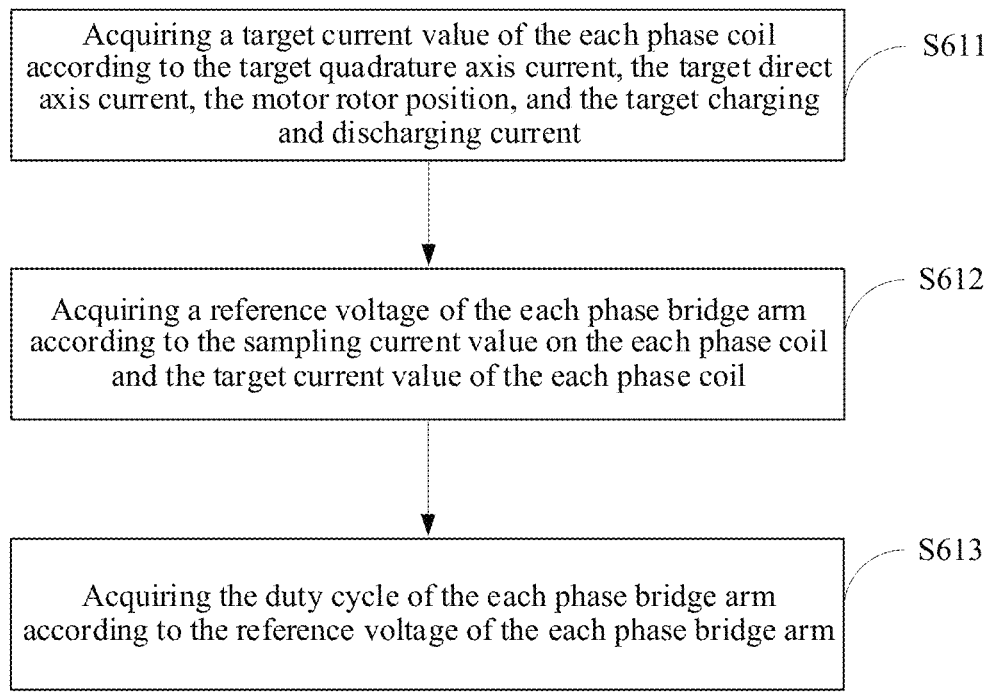
FIG. 12 is a flowchart of step S610 in the cooperative control method for an energy conversion apparatus according to Embodiment I of the disclosure.

In a second implementation, as shown in FIG. 12, step S60 of acquiring the sampling current value on each phase coil and the motor rotor position, and calculating the duty cycle of each phase bridge arm in the reversible PWM rectifier 102 according to the target quadrature axis current, the target direct axis current, the target charging and discharging current, the sampling current value on each phase coil, and the motor rotor position includes the following steps.

Step S611: Acquiring a target current value of each phase coil according to the target quadrature axis current, the target direct axis current, the motor rotor position, and the target charging and discharging current.

In an implementation, step S611 includes:

performing a linear transformation on the target charging and discharging current in* to acquire a target zero-axis current i0* of each set of windings, and performing extended inverse Park and extended inverse Clark coordinate transformation according to the target quadrature axis current iq*, the target direct axis current id*, the motor rotor position, and the target zero-axis current i0*, to acquire the target current value of each phase coil.

Step S612: Acquiring a reference voltage of each phase bridge arm according to the sampling current value on each phase coil and the target current value of each phase coil.

Step S613: Acquiring the duty cycle of each phase bridge arm according to the reference voltage of each phase bridge arm.

In the above two steps, closed-loop regulation is performed on the sampling current value on each phase coil and the target current value on each phase coil. The closed-loop regulation mode may be the PID control, PR control, sliding mode control, or the like.

A difference between this implementation and the above implementation is that, closed-loop control is performed by applying the parameter value of the multiphase motor to a phase axis reference frame. In this way, the cooperative working of the heating process, the charging and discharging process, and the torque output process is achieved.

Figure 13:
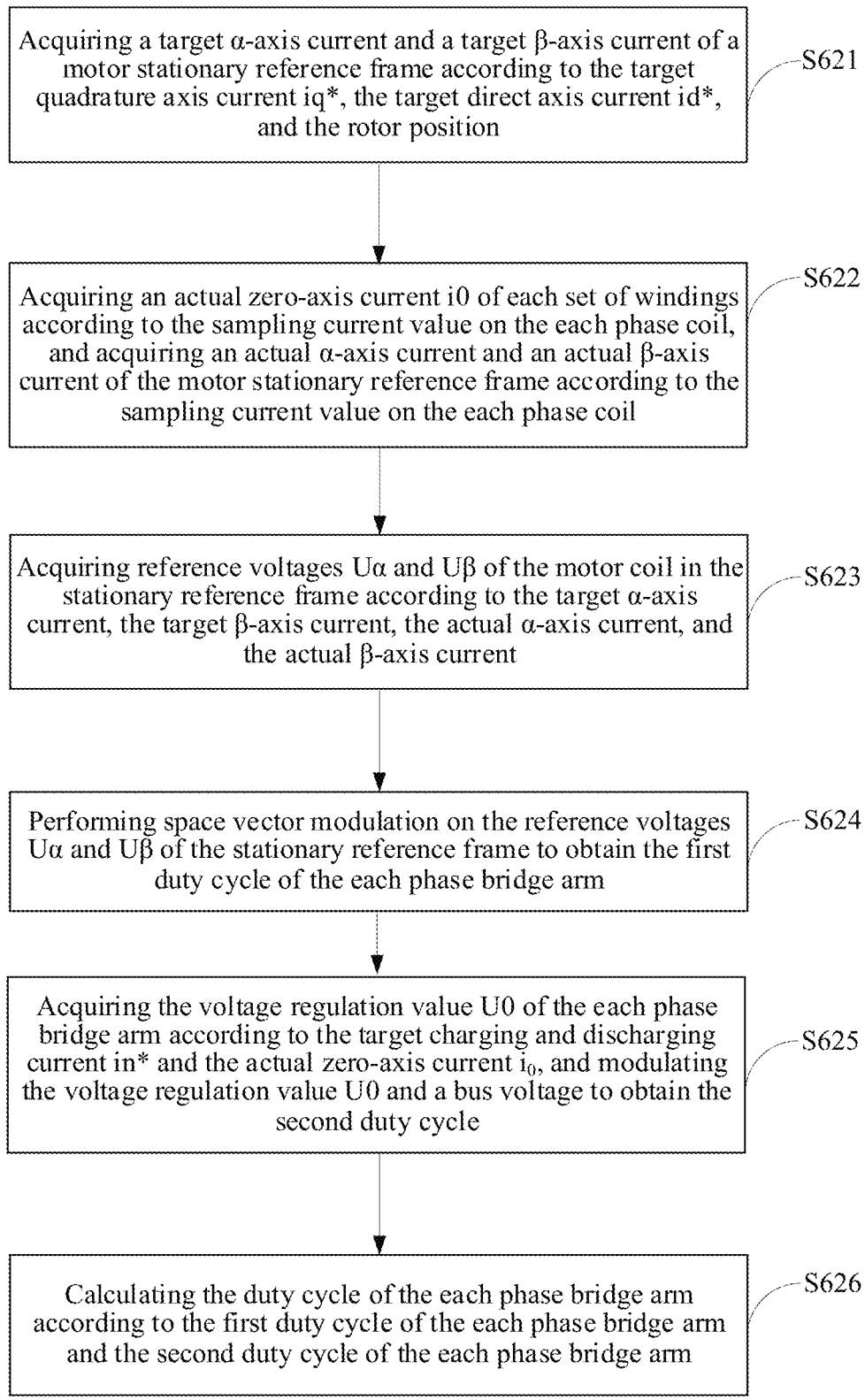
FIG. 13 is a flowchart of step S620 in the cooperative control method for an energy conversion apparatus according to Embodiment I of the disclosure.

In step S60, in a third implementation, as shown in FIG. 13, step S60 includes the following steps.

Step S621: Acquiring a target α-axis current and a target β-axis current of a stationary reference frame according to the target quadrature axis current iq*, the target direct axis current id*, and the motor rotor position.

Step S622: Acquiring an actual zero-axis current i0 of each set of windings according to the sampling current value on each phase coil, and acquiring an actual α-axis current and an actual β-axis current of the stationary reference frame according to the sampling current value on each phase coil.

Step S623: Performing control (for example, PID control) according to the target α-axis current, the target β-axis current, the actual α-axis current, and the actual β-axis current to acquire reference voltages Uα and Uβ of the motor coil 103 in the stationary reference frame.

Step S624: Performing space vector pulse width modulation on the reference voltages Uα and Uβ of the stationary reference frame to obtain the first duty cycle of each phase bridge arm.

Step S625: Performing control (for example, the PID control) according to the target charging and discharging current in* and the actual zero-axis current i0 to acquire a voltage regulation value U0 of each phase bridge arm, and modulating the voltage regulation value U0 and a bus voltage to obtain a second duty cycle.

Step S626: Calculating the duty cycle of each phase bridge arm according to the first duty cycle of each phase bridge arm and the second duty cycle of each phase bridge arm.

A difference between this implementation and the above implementation is that closed-loop control is performed by applying the parameter value of the multiphase motor to the stationary reference frame. In this way, the cooperative working of the heating process, the charging and discharging process, and the torque output process is achieved.

Embodiment I of the disclosure provides a cooperative control method for an energy conversion apparatus. By using the energy conversion apparatus including the reversible PWM rectifier 102 and the motor coil 103, when the energy conversion apparatus is connected with the external battery 101 and connected with a power supply device or an electric device by using the charging and discharging port 104, the target heating power, the target driving power, and the target charging and discharging power are acquired. The first heating power is acquired according to the target charging and discharging power. The first quadrature axis current and the first direct axis current are acquired according to the target driving power. The second heating power of the motor coil 103 is acquired according to the first quadrature axis current and the first direct axis current. The first quadrature axis current and the first direct axis current are adjusted according to the relationship between the sum of the first heating power and the second heating power and the target heating power, to obtain the target quadrature axis current and the target direct axis current. The duty cycle of each phase bridge arm in the reversible PWM rectifier is calculated according to the target quadrature axis current, the target direct axis current, the target charging and discharging current, the sampling current value on each phase coil, and the motor rotor position. The turn-on and turn-off of a switch device on each phase bridge arm in the reversible PWM rectifier are controlled according to the duty cycle. In this way, the currents outputted by the external battery 101 or the power supply device are caused to flow through the motor coil 103 to generate heat, so as to heat the cooling liquid flowing through a cooling tube of the motor coil 103. Therefore, a power battery is heated when the cooling liquid flows through the power battery, and heated in combination with heat generation by the charging or discharging of the battery itself. In this way, an additional power battery heating apparatus can be omitted, thereby reducing the costs of the entire apparatus and ensuring the charging and discharging of the battery at a low temperature. In addition, the cooperative working of the charging and discharging process, the heating process, and the torque output process can be achieved, that is, the cooperative working of processes of charging the battery, heating a motor, and outputting motor torque by the discharging of the external power supply device (such as, a charging pile), or the cooperative working of processes of supplying power, heating the motor, and outputting the motor torque by discharging to the external electric device (such as, a vehicle) by the battery.

Figure 14:
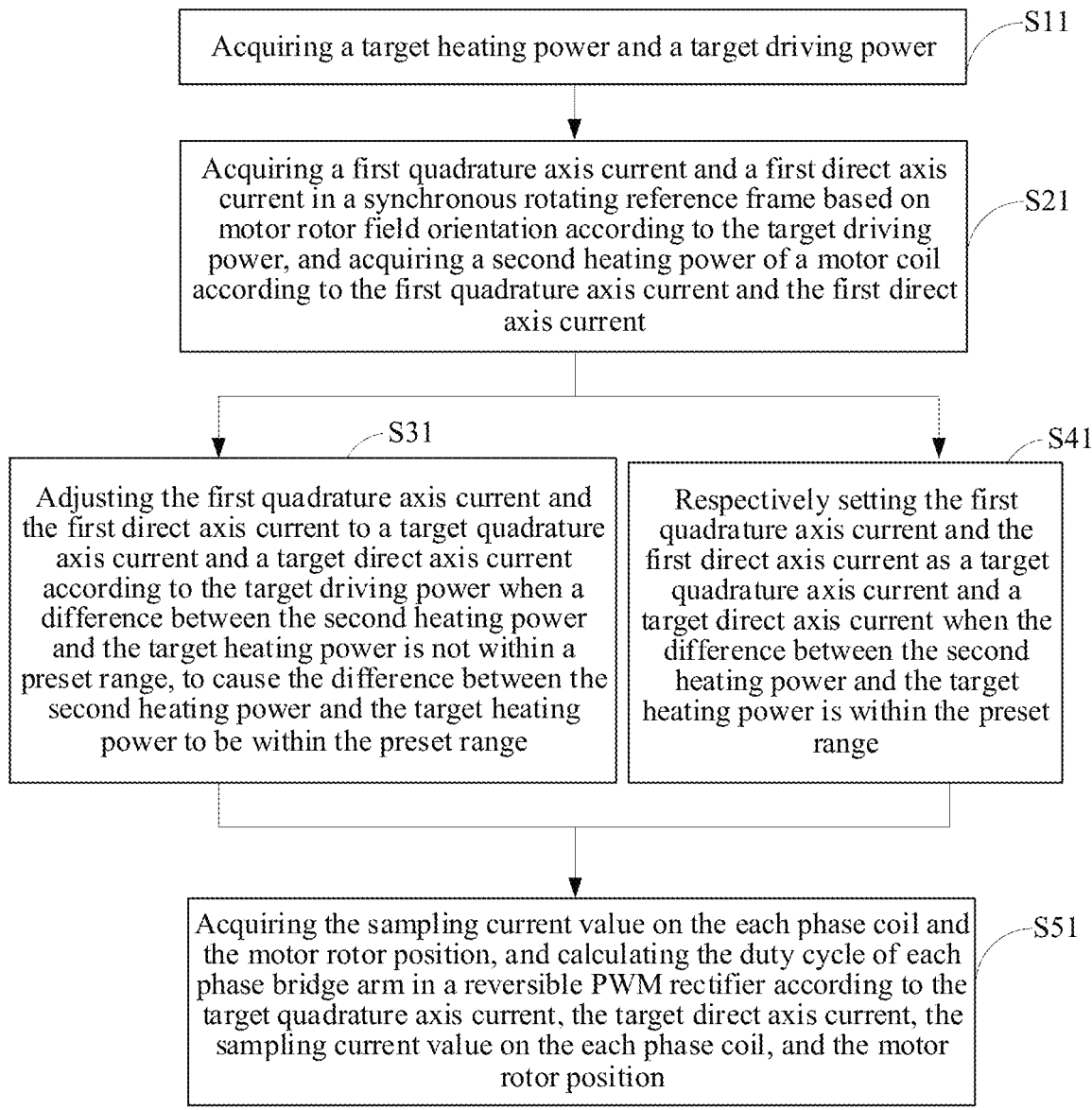
FIG. 14 is a flowchart of a cooperative control method for an energy conversion apparatus according to Embodiment II of the disclosure.

Embodiment II of the disclosure provides a cooperative control method for an energy conversion apparatus. As shown in FIG. 14, when the target charging and discharging power is zero, the target charging and discharging current and the first heating power are zero, and the cooperative control method includes the following steps.

Step S11: Acquiring a target heating power and a target driving power.

Step S21: Acquiring, according to the target driving power, a first quadrature axis current and a first direct axis current in a synchronous rotating reference frame based on a motor rotor field orientation, and acquiring a second heating power of the motor coil according to the first quadrature axis current and the first direct axis current.

Step S31: Adjusting the first quadrature axis current and the first direct axis current to a target quadrature axis current and a target direct axis current according to the target driving power when a difference between the second heating power and the target heating power is not within a preset range, to cause the difference between the second heating power and the target heating power to be within the preset range.

Step S41: Respectively setting the first quadrature axis current and the first direct axis current as a target quadrature axis current and a target direct axis current when the difference between the second heating power and the target heating power is within the preset range.

Step S51: Acquiring a sampling current value on each phase coil and a motor rotor position, and calculating a duty cycle of each phase bridge arm in the reversible PWM rectifier according to the target quadrature axis current, the target direct axis current, the sampling current value on each phase coil, and the motor rotor position.

Embodiment II of the disclosure provides a cooperative control method for an energy conversion apparatus. A difference between this embodiment and Embodiment I is that the target charging and discharging power is zero, the motor coil is controlled to be heated, and the motor is simultaneously controlled to output torque. By using the energy conversion apparatus including the reversible PWM rectifier and the motor coil, when the energy conversion apparatus is connected with the external battery and connected with the power supply device or the electric device through the charging and discharging port, the target heating power and the target driving power are acquired. The first quadrature axis current and the first direct axis current are acquired according to the target driving power. The second heating power of the motor coil is acquired according to the first quadrature axis current and the first direct axis current. The first quadrature axis current and the first direct axis current are adjusted according to the relationship between the second heating power and the target heating power, to obtain the target quadrature axis current and the target direct axis current. The duty cycle of each phase bridge arm in the reversible PWM rectifier is calculated according to the target quadrature axis current, the target direct axis current, the target charging and discharging current, the sampling current value on each phase coil, and the motor rotor position. The turn-on and turn-off of a switch device on each phase bridge arm in the reversible PWM rectifier are controlled according to the duty cycle. In this way, currents outputted by the external battery or the power supply device flow through the motor coil to generate heat, so as to heat the cooling liquid flowing through a cooling tube of the motor coil. In addition, a power battery is heated when the cooling liquid flows through the power battery, and an additional power battery heating apparatus can be omitted. Therefore, the costs of the entire apparatus can be reduced, and the charging and discharging of the battery at a low temperature can be guaranteed. Moreover, the cooperative working of the heating process and the torque output process is achieved.

Figure 15:
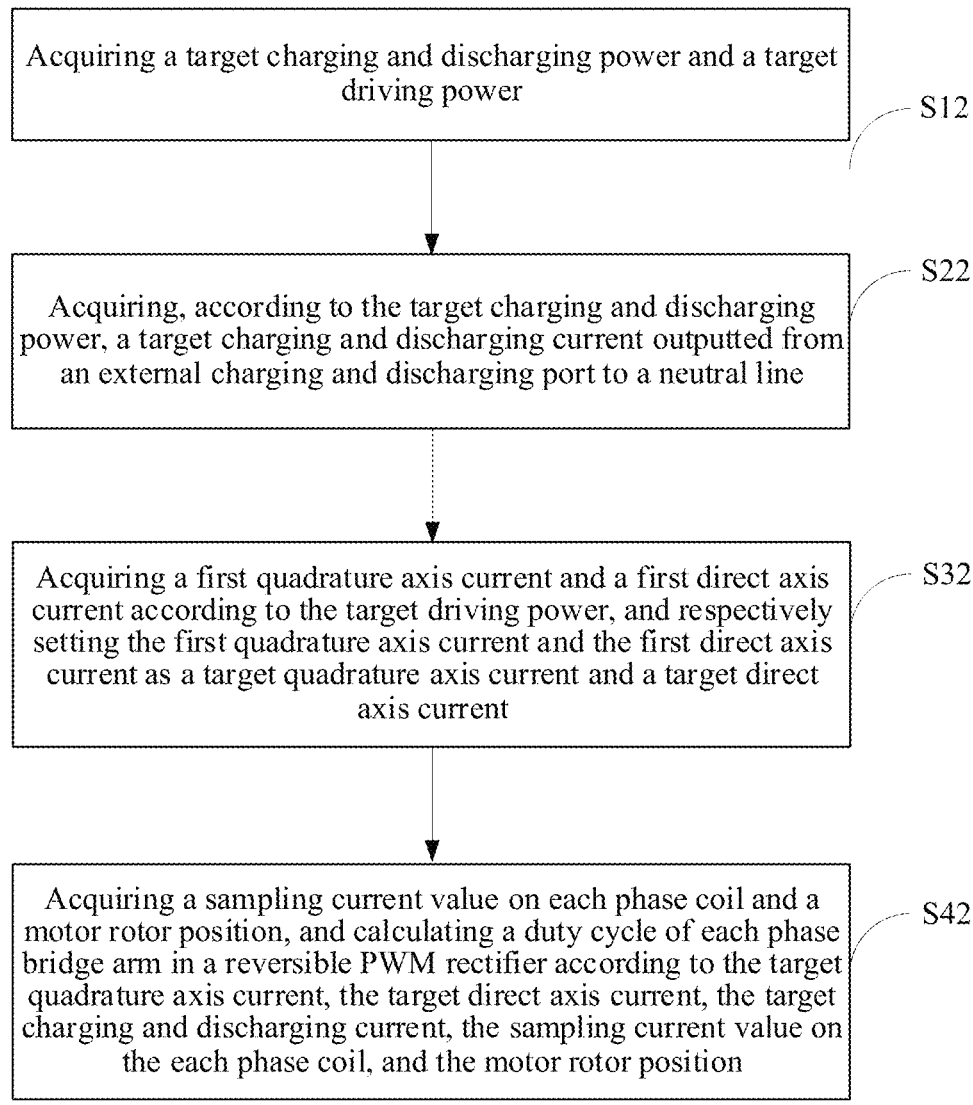
FIG. 15 is a flowchart of a cooperative control method for an energy conversion apparatus according to Embodiment III of the disclosure.

Embodiment III of the disclosure provides a cooperative control method for an energy conversion apparatus. As shown in FIG. 15, when the target heating power is zero, the cooperative control method includes the following steps.

Step S12: Acquiring a target charging and discharging power and a target driving power.

Step S22: Acquiring, according to the target charging and discharging power, a target charging and discharging current outputted from an external charging and discharging port to a neutral line.

Step S32: Acquiring a first quadrature axis current and a first direct axis current according to the target driving power, and respectively setting the first quadrature axis current and the first direct axis current as a target quadrature axis current and a target direct axis current.

Step S42: Acquiring a sampling current value on each phase coil and a motor rotor position, and calculating a duty cycle of each phase bridge arm in a reversible PWM rectifier according to the target quadrature axis current, the target direct axis current, the target charging and discharging current, the sampling current value on each phase coil, and the motor rotor position.

Embodiment III of the disclosure provides a cooperative control method for an energy conversion apparatus. A difference between this embodiment and Embodiment I is that the target heating power is zero, the motor coil is controlled to charge and discharge, and the motor is simultaneously controlled to output the torque. The target charging and discharging current is acquired according to the target charging and discharging power. The first quadrature axis current and the first direct axis current are acquired according to the target driving power, and are respectively set as the target quadrature axis current and the target direct axis current. The duty cycle of each phase bridge arm in the reversible PWM rectifier is calculated according to the target quadrature axis current, the target direct axis current, the target charging and discharging current, the sampling current value on each phase coil, and the motor rotor position. In this way, the cooperative working of the charging and discharging process and the torque output process is achieved.

Figure 16:
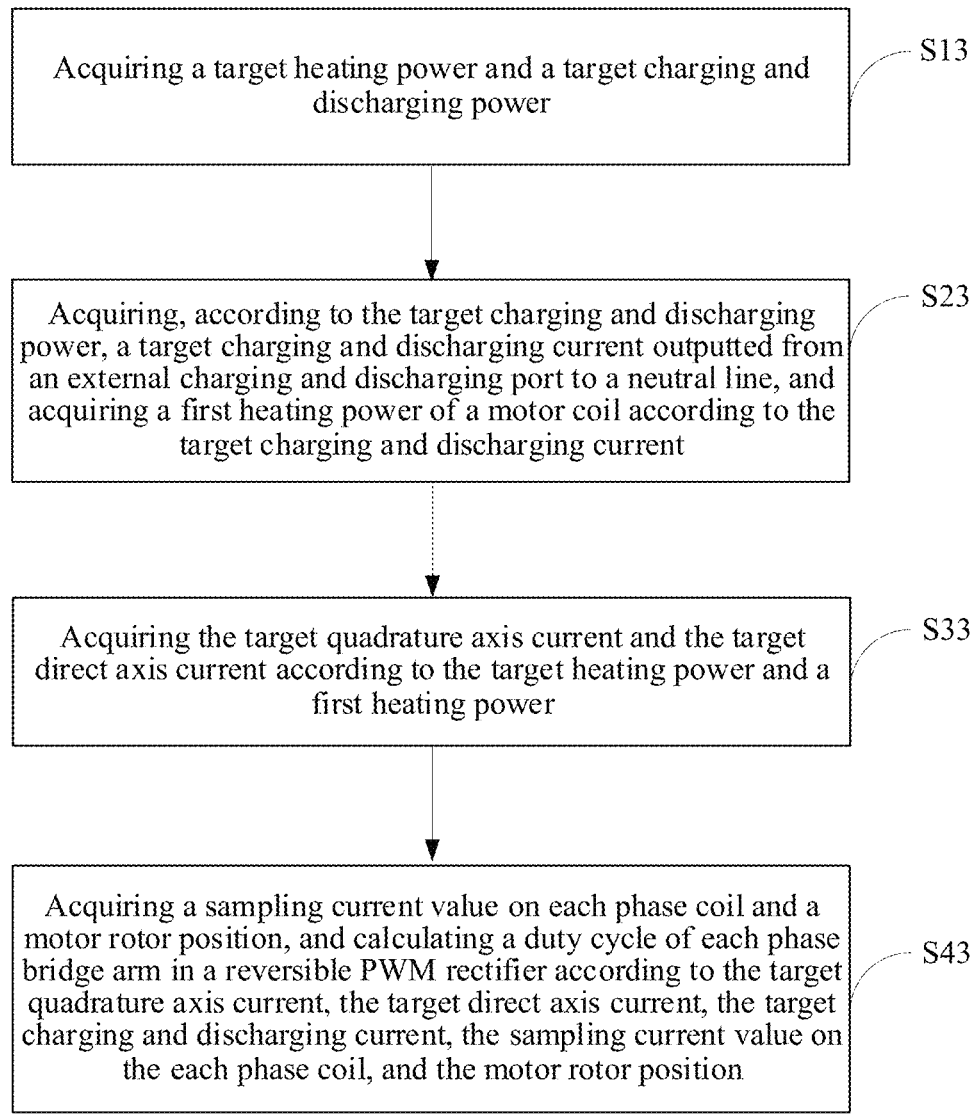
FIG. 16 is a flowchart of a cooperative control method for an energy conversion apparatus according to Embodiment IV of the disclosure.

Embodiment IV of the disclosure provides a cooperative control method for an energy conversion apparatus. As shown in FIG. 16, when the target driving power is zero, the cooperative control method includes the following steps.

Step S13: Acquiring a target heating power and a target charging and discharging power.

Step S23: Acquiring, according to the target charging and discharging power, a target charging and discharging current outputted from an external charging and discharging port to a neutral line, and acquiring a first heating power of a motor coil according to the target charging and discharging current.

Step S33: Acquiring a target quadrature axis current and a target direct axis current according to the target heating power and the first heating power.

Step S43: Acquiring a sampling current value on each phase coil and a motor rotor position, and calculating a duty cycle of each phase bridge arm in a reversible PWM rectifier according to the target quadrature axis current, the target direct axis current, the target charging and discharging current, the sampling current value on each phase coil, and the motor rotor position.

Embodiment IV of the disclosure provides a cooperative control method for an energy conversion apparatus. A difference between this embodiment and Embodiment I is that the target driving power is zero, and the motor coil is controlled to charge and discharge the battery and is controlled to be heated simultaneously. The target charging and discharging current is acquired according to the target charging and discharging power. The first heating power of the motor coil is acquired according to the target charging and discharging current. The target quadrature axis current and the target direct axis current are acquired according to the relationship between the target heating power and the first heating power. At this point, the target quadrature axis current is zero. The duty cycle of each phase bridge arm in the reversible PWM rectifier is calculated according to the target direct axis current, the target charging and discharging current, the sampling current value on each phase coil, and the motor rotor position. In this way, the cooperative working of the heating process and the charging and discharging process is achieved, and the output of zero torque is also realized.

The disclosure is specifically described below by using a specific vector control diagram.

Figure 17:
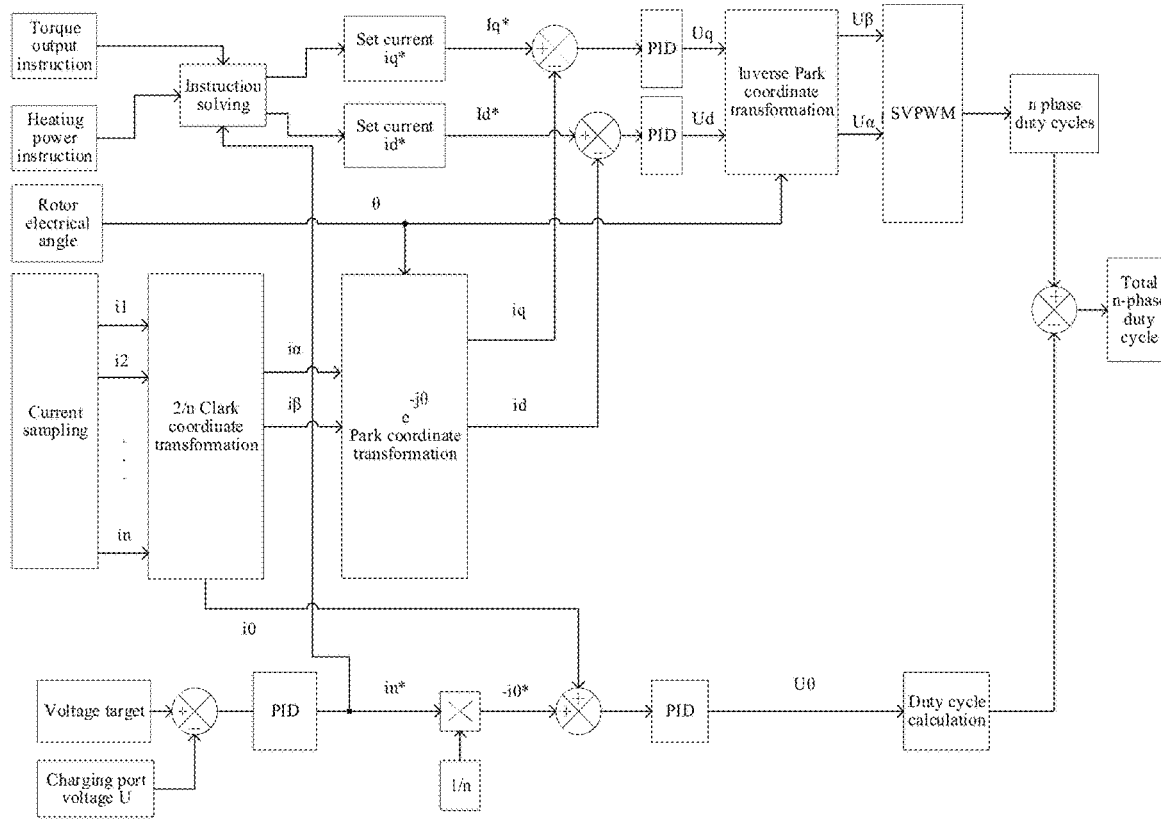
FIG. 17 is a vector control diagram of the cooperative control method for an energy conversion apparatus according to Embodiment I of the disclosure.
Figure 18:
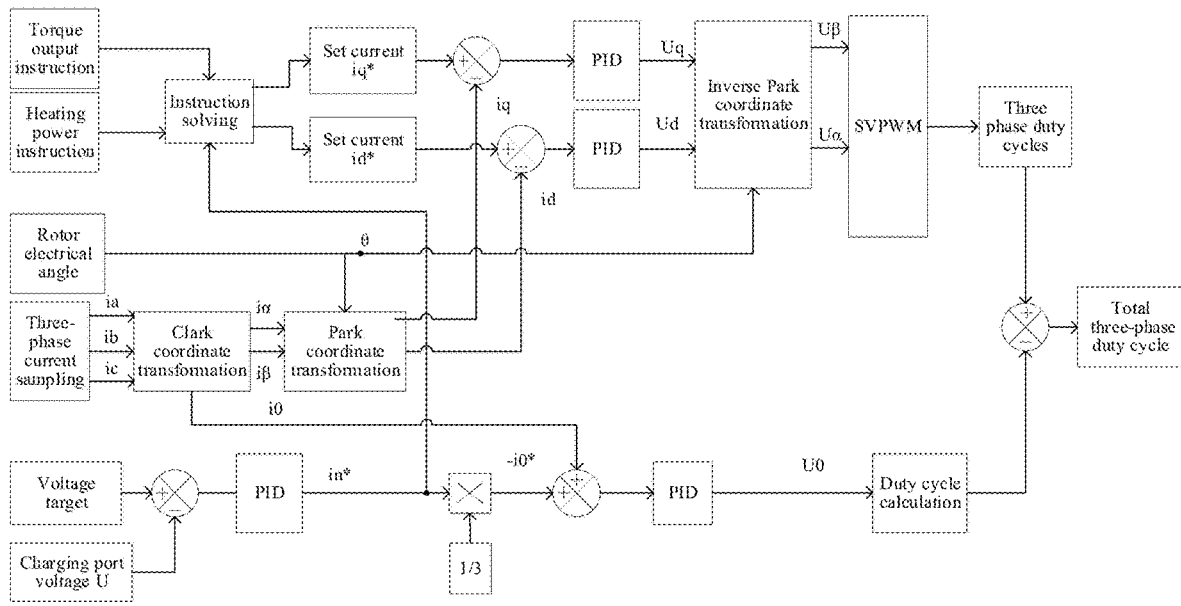
FIG. 18 is another vector control diagram of the cooperative control method for an energy conversion apparatus according to Embodiment I of the disclosure.

FIG. 17 is a vector control block diagram of an n-phase motor according to the disclosure, involving vector control of a multiphase motor. Vectors of the multiphase motor are applied to the synchronous rotating reference frame to perform closed-loop control. By using a three-phase motor as an example, FIG. 18 is a vector control system block diagram of the three-phase motor corresponding to FIG. 17. The control process is as follows. A controller receives a changing and discharging instruction, a torque output instruction, and a heating power instruction. The changing and discharging instruction is to give a voltage value or a current value. A voltage target is acquired according to the changing and discharging instruction. A voltage at a charging port is acquired and closed-loop control (for example, PID control) is performed on the voltage and the voltage target, so as to obtain a target charging and discharging current in*. An instruction application process is performed according to the output torque, the heating power, and the target charging and discharging current in* to obtain the target quadrature axis current iq* and the target direct axis current id*. Three phase current values ia, ib, and ic are sampled and converted to the synchronous rotating reference frame by means of coordinate transformation to obtain the actual direct axis current id and the actual quadrature axis current iq. A difference between the actual direct axis current id and the actual quadrature axis current iq and the target direct axis current id* and the target quadrature axis current iq* is calculated, and then a target value Ud and a target value Uq are outputted by means of control (for example, PID control). Inverse Park transformation is performed on Ud and Uq to obtain Uα and Uβ. The SVPWM algorithm is performed on Uα and Uβ to obtain duty cycles Da, db, and Dc of three-phase bridge arms of an inverter. A required current value i0* and an actual current value i0 (i0 is extracted from the current samples ia, ib, and ic by means of extended Clark coordinate transformation) are calculated by using the required current value in*, and the closed-loop control is performed to obtain a required duty cycle D0. Subtraction is respectively performed between D0 and Da, db, and Dc to obtain an actual duty cycle of the three-phase bridge arm, so as to perform closed-loop current control.

Figure 19:
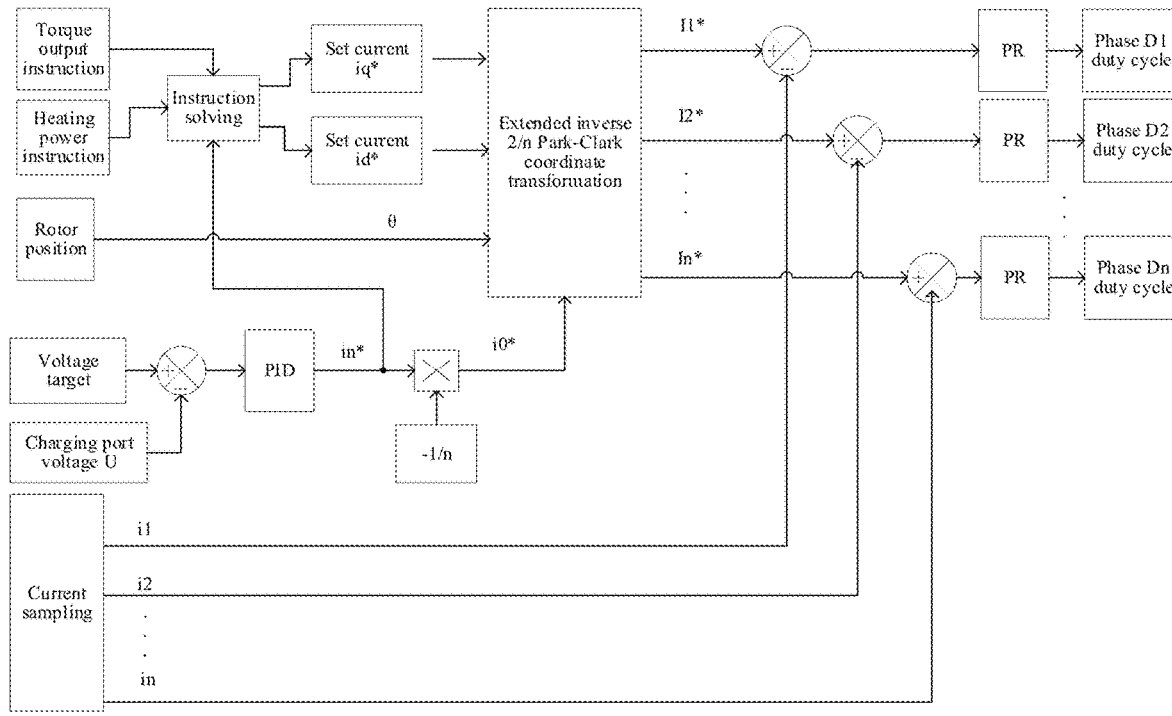
FIG. 19 is another vector control diagram of the cooperative control method for an energy conversion apparatus according to Embodiment I of the disclosure.
Figure 20:
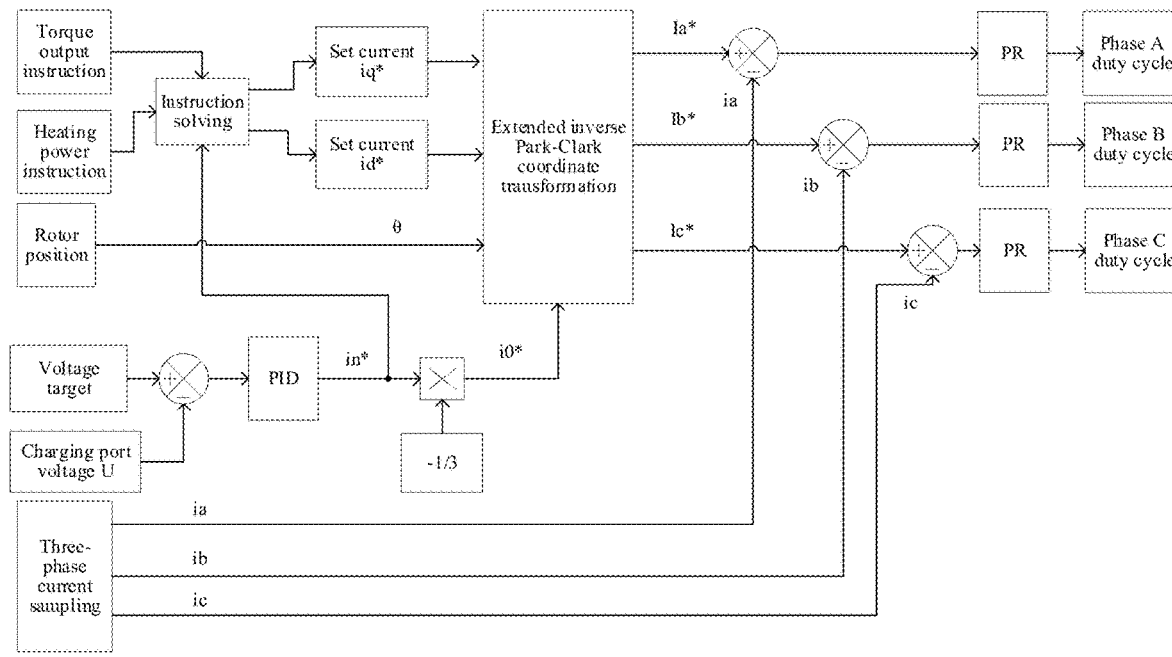
FIG. 20 is another vector control diagram of the cooperative control method for an energy conversion apparatus according to Embodiment I of the disclosure.

FIG. 19 is another control block diagram of an n-phase motor according to the disclosure, involving vector control of a multiphase motor. Vectors of the multiphase motor are applied to an N-phase axis reference frame to perform closed-loop control. By using the three-phase motor as an example, FIG. 20 is a vector control system block diagram of the three-phase motor corresponding to FIG. 19. The control process is as follows. A controller receives a changing and discharging instruction, a torque output instruction, and a heating power instruction. The changing and discharging instruction is to give a voltage value or a current value. A voltage target is acquired according to the changing and discharging instruction. A voltage at a charging port is acquired and closed-loop control (for example, PID control) is performed on the voltage and the voltage target, so as to obtain a target charging and discharging current in*. An instruction application process is performed according to the output torque, the heating power, and the target charging and discharging current in* to obtain the target quadrature axis current iq* and the target direct axis current id*. Extended inverse Park-Clark coordinate transformation is performed on the target quadrature axis current iq* and the target direct axis current id*, and a target value is applied to a stator winding axis system ABC, that is, Ia*, Ib*, and Ic*. Closed-loop regulation is performed on the target values Ia*, Ib*, and Ic* on the stator winding axis system and the sampled actual values Ia, Ib, and Ic, and the duty cycles Da, db, and Dc of the bridge arms are outputted to regulate and control currents to follow the target values. The regulation mode may be PID control, PR control, sliding mode control, or the like.

By using a three-phase and four-wire motor as an embodiment, m=3, three phase currents (ia, ib, and ic) are measured, and the measured currents (ia, ib, and ic) are converted to iα, iβ, and i0 on a two-phase stationary reference frame by means of extended Clark transformation. A zero current vector is i0, and an N-line current is negative three times (in=−3*i0) a zero current component. iα and iβ are transformed into field-oriented current vectors id and iq by means of Park transformation, id is the direct axis current, iq is the quadrature axis current, and θ is an electrical angle [if the motor is an asynchronous motor, θ=(a rotor speed Wr+a slip Ws)*t] between a direct axis of the motor rotor and a phase A winding of a motor winding. θ is obtained by using a rotary transformer or other position sensors or a positionless sensor to read the motor rotor position.

A zero-axis current vector i0:

$$i0 = \frac{ia + ib + ic}{3}$$

$$i_n = -(ia + ib + ic) = -3i_0$$

A current instruction *: N-line current in=−3*i0, the vector i0* current on a 0 axis is set, and the charging and discharging power is controlled.

The disclosure is specifically described below according to different modes of the energy conversion apparatus. The motor is the three-phase motor by way of example.

First Step: Instruction Application

When at most one of the changing and discharging instruction, the torque output instruction, and the heating power instruction is not zero, instruction application and allocation is performed in the following manner.

A first working mode: When the changing and discharging instruction, the torque output instruction, and the heating power instruction (the instruction being a required power) are all zero, all switches are turned off.

A second working mode: there is only the torque output instruction.

The changing and discharging instruction is 0, that is, the changing and discharging current in*=0, and the heating power instruction is 0. The instruction application process is to look up or calculate, based on the MTPA&MTPV curves in the torque graph of FIG. 6 by using the torque output instruction and the current rotational speed we of the motor, two corresponding required values of the target quadrature axis current iq* and the target direct axis current id* on dq coordinate axes of the synchronous rotating reference frame, so as to ensure the requirements of the torque output instruction. At this point, a control operation is not performed on a current circuit of the target charging and discharging current in*. The energy required for the torque output instruction is from the external battery 101 or the external power supply device.

A third working mode: there is only the heating power instruction.

The changing and discharging instruction is 0, that is, the changing and discharging current in*=0, and the torque output instruction is 0 or a smaller value, that is, the target quadrature axis current iq*=0 or iq* is a smaller value (meshing gear clearance to prevent the motor rotor from shaking). A vector in a direction of the target direct axis current id* is set. A set heating power is solved as id* according to the formula 4, id* may be positive or negative, and id* is preferably a positive value, that is, a direction of an enhanced magnetic field. Alternatively, the obtained id* is superposed with a sinusoidal high-frequency signal. A larger battery impedance leads to greater heat, so as to enhance heating of the battery. The heating power may be calculated in advance and the bench is calibrated. A method of table lookup or linear fitting is used to obtain current control instructions id* and iq* by using the heating power.

$$P = \frac{m}{2} R_s (id^*)^2. \qquad \text{Formula 4}$$

A determination mode is set according to a current instruction. id*, iq*, and in* are obtained after a solving process. At this point, a control operation is not performed on the target in* current circuit. The energy required for the heating instruction is from the battery or the external power supply device.

A fourth working mode: there is only the changing and discharging instruction: the torque output instruction is 0, the heating power instruction is 0, iq*=0, id*=0, and in*≠0.

When the external power supply connected to the external charging and discharging port 104 is in a constant current charging and discharging mode, a motor controller adopts voltage-current double closed-loop control. The current instruction in* is an output quantity after a charging and discharging voltage instruction U* and voltage sampling closed-loop control.

When the external power supply connected to the external charging and discharging port 104 is in a constant current charging and discharging mode, the motor controller may further adopt voltage closed-loop control. There is only a voltage closed-loop process. The output quantity after the voltage instruction U* and the voltage sampling closed-loop control is directly converted to the duty cycle of the bridge arm, and (in=−ia−ib−ic) is obtained by means of in sampling.

When the external power supply connected to the external charging and discharging port 104 is in a constant voltage charging and discharging mode, the motor controller adopts current closed-loop control. The current instruction in* is issued and set directly by a battery manager without the voltage closed-loop process.

Targets id*, iq*, and in* are obtained by using a vector control solving process.

During charging, in*>0, and during discharging, in*<0.

When at least two of the changing and discharging instruction, the torque output instruction, and the heating power instruction are not zero, instruction application and allocation is performed in the following manner.

A fifth working mode: there are only the changing and discharging instruction and the heating power instruction, and the torque output instruction * is 0:

The changing and discharging instruction:

When the external power supply connected to the external charging and discharging port 104 is in the constant current charging and discharging mode, the motor controller may adopt voltage-current double closed-loop control. The current instruction in* is the output quantity after the charging and discharging voltage instruction U* and voltage sampling closed-loop control. Currents in on N lines are sampled to perform current closed-loop control.

When the external power supply connected to the external charging and discharging port 104 is in the constant voltage charging and discharging mode, the motor controller may further adopt current closed-loop control. The current instruction in* is issued and set directly by a battery manager without the voltage closed-loop process. The currents in on the N lines are sampled to perform the current closed-loop control.

When the external power supply connected to the external charging and discharging port 104 is in the constant current charging and discharging mode, the motor controller may further adopt voltage closed-loop control. There is only the voltage closed-loop process. The output quantity after the voltage instruction U* and voltage sampling closed-loop control is directly converted to the duty cycle of the bridge arm. The currents in on the N lines are sampled.

The heating power instruction: in is sampled and the heating power is set. id* is solved according to the formula 5. id* may be positive or negative, and the id* is preferably the positive value, that is, the direction of the enhanced magnetic field. The heating power may be calculated in advance and the bench is calibrated. The method of table lookup or linear fitting is used to obtain target currents id* and iq* by using the heating power.

$$P = \frac{m}{2} R_s (id^*)^2 + m R_{sn} \left(\frac{in^*}{m}\right)^2. \quad \text{Formula 5}$$

According to the changing and discharging instruction and after the solving process of the heating power instruction, targets id*, iq*, and in* are obtained. During charging, in*>0, and during discharging, in*<0.

For the formula 5, when there are a plurality of neutral lines led out from a plurality of winding poles, it is required to use each neutral line as a whole for calculation by using the formula 5. The plurality of neutral lines are superposed for calculation.

A sixth working mode: there is only the changing and discharging instruction and the torque output instruction, and the heating power instruction is 0:

The changing and discharging instruction:

When the external power supply connected to the external charging and discharging port 104 is in the constant current charging and discharging mode, the motor controller may adopt voltage-current double closed-loop control. The current instruction in* is the output quantity after the charging and discharging voltage instruction U* and voltage sampling closed-loop control. Currents in on N lines are sampled to perform current closed-loop control.

When the external power supply connected to the external charging and discharging port 104 is in the constant voltage charging and discharging mode, the motor controller may further adopt current closed-loop control. The current instruction in* is issued and set directly by a battery manager without the voltage closed-loop process. The currents in on the N lines are sampled to perform the current closed-loop control.

When the external power supply connected to the external charging and discharging port 104 is in the constant current charging and discharging mode, the motor controller may further adopt voltage closed-loop control. There is only the voltage closed-loop process. The output quantity after the voltage instruction U* and voltage sampling closed-loop control is directly converted to the duty cycle of the bridge arm. The currents in on the N lines are sampled.

The torque output instruction: the instruction application process is to find and give, based on the MTPA&MTPV curves in the torque graph of FIG. 6 by using the torque output instruction, two corresponding required values of id* and iq* on the dq coordinate axis of the synchronous rotating reference frame, so as to ensure the torque output instruction requirements.

After the solving process, the targets id*, iq*, and in* are obtained. During charging, in*>0, and during discharging, in*<0.

A seventh working mode: there are only the heating power instruction and the torque output instruction, and the changing and discharging instruction is 0:

The heating power instruction:

$$P = \frac{m}{2} R_s \left[(id^*)^2 + (iq^*)^2\right]. \quad \text{Formula 7}$$

The torque output instruction: a constant torque curve is solved. Referring to constant torque curves Te1, Te2, and Te3 in the torque graph of FIG. 6, Te1>Te2>Te3. The constant torque curves in the torque graph may be calculated in advance and the bench is calibrated. Generally, the method of table lookup or linear fitting is used to obtain the current control instruction by using the torque. The id* and iq* that satisfy the torque output instruction are found by using the MTPA&MTPV curves. The id* and iq* are substituted into the formula 7 to check whether to satisfy a required heating power. If no, values of id* and iq* slide along the constant torque curve. When the difference between the sum of the first heating power and the second heating power and the target heating power is less than the preset lower limit range, the values can move in both a direction in which id increases toward a positive axis and a direction in which id decreases toward a negative axis, and preferably move in the direction in which the id increases toward the positive axis. Iteration is performed until the formula 7 is satisfied or the difference is within an error range specified in the formula 7. The heating power may be calculated in advance and the bench is calibrated. The method of table lookup or linear fitting is used to obtain the current control instructions id* and iq* by using the heating power.

At this point, the control operation is not performed on a target in* current circuit. After the solving process, the targets id*, iq*, and in* are obtained.

An eighth working mode: none of the changing and discharging instruction, the heating power instruction, and the torque output instruction is zero.

The changing and discharging instruction: When the external power supply connected to the external charging and discharging port 104 is in the constant current charging and discharging mode, the motor controller may adopt voltage-current double closed-loop control. The current instruction in* is the output quantity after the charging and discharging voltage instruction U* and voltage sampling closed-loop control. Currents in on N lines are sampled to perform current closed-loop control.

When the external power supply connected to the external charging and discharging port 104 is in the constant voltage charging and discharging mode, the motor controller may adopt current closed-loop control. The current instruction in* is issued and set directly by a battery manager without the voltage closed-loop process. The currents in on the N lines are sampled to perform the current closed-loop control.

When the external power supply connected to the external charging and discharging port 104 is in the constant current charging and discharging mode, the motor controller may adopt voltage closed-loop control. There is only the voltage closed-loop process. The output quantity after the voltage instruction U* and voltage sampling closed-loop control is directly converted to the duty cycle of the bridge arm. The currents in on the N lines are sampled.

The heating power instruction:

$$P = \frac{m}{2}R_s\left[(id^*)^2 + (iq^*)^2\right] + mR_{sn}\left(\frac{in^*}{m}\right)^2.\qquad \text{Formula 8}$$

The torque output instruction: the constant torque curve is solved. The constant torque curves in the torque graph may be calculated in advance and the bench is calibrated. Generally, the method of table lookup or linear fitting is used to obtain the current control instruction by using the torque. The id* and iq* that satisfy the torque output instruction are found by using the MTPA&MTPV curves. The id* and iq* are substituted into the formula 8 to check whether to satisfy a required heating power. If no, values slide along the constant torque curve and move in a direction in which ((id*)²+(iq*)²) increases, which can move in both a direction in which id* increases toward a positive axis and a direction in which id* decreases toward a negative axis, and preferably move in the direction in which the id* increases toward the positive axis. Iteration is performed until the formula 8 is satisfied or the error is within an error range specified in the formula 8. The heating power may be calculated in advance and the bench is calibrated. The method of table lookup or linear fitting is used to obtain the current control instructions id* and iq* by using the heating power.

Targets id*, iq*, and in* are obtained after the solving process.

A usage scenario existing in all of the changing and discharging instruction, the heating power instruction, and the torque output instruction is a deicing vehicle or a lunar rover on a solar high-voltage line.

Second Step: Closed-Loop Mode Determination

In the first step of mode determination, in addition to all instructions being 0 and no control, a case that the charging and discharging instruction in*=0 needs to be determined. When in*=0, the charging and discharging current or voltage is not controlled, and electricity is taken from the battery for motor drive, heating, or drive heating control. When in*≠0, the charging and discharging instruction participates in the closed-loop control.

Third Step: Control Process:

The solving process is performed on the changing and discharging instruction, the heating power instruction, and the torque output instruction to obtain target parameter values id*, iq*, and in*.

A circuit structure of the energy conversion apparatus may adopt the following circuit structure.

Figure 21:
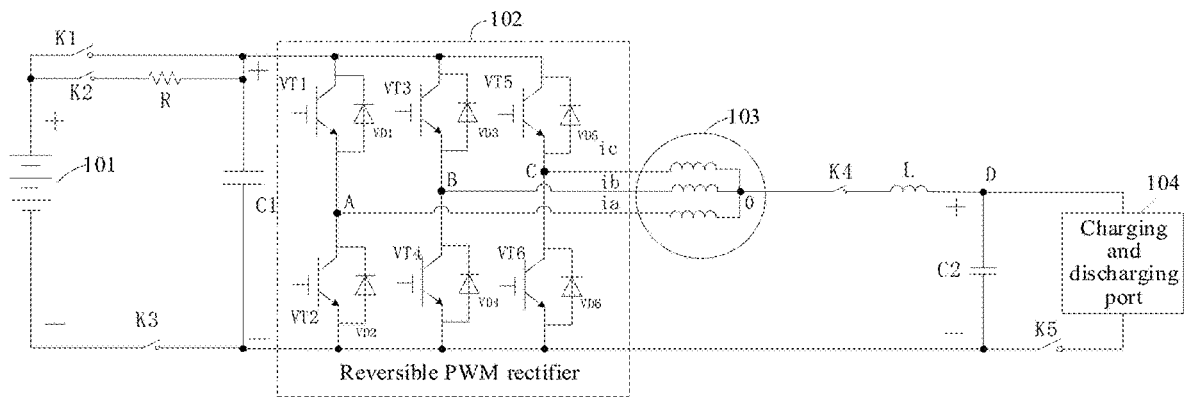
FIG. 21 is a circuit diagram of an energy conversion apparatus according to Embodiment I of the disclosure.

FIG. 21 is a circuit diagram of an energy conversion apparatus according to this implementation. The energy conversion apparatus includes the reversible PWM rectifier 102, the motor coil 103, a switch K1, a switch K2, a resistor R, a switch K3, and a capacitor C1. A positive electrode of the external battery is connected with a first end of the switch K1 and a first end of the switch K2. A second end of the switch K1 is connected with a first end of the capacitor C1. A second end of the switch K2 is connected with a first end of the resistor R. A second end of the resistor R is connected with the first end of the capacitor C1. A negative electrode of the external battery is connected with a first end of the switch K3. A second end of the switch K3 is connected with a second end of the capacitor C1. The reversible PWM rectifier includes three-phase bridge arms. The first phase bridge arm includes a first power switch unit and a second power switch unit connected in series. The second phase bridge arm includes a third power switch unit and a fourth power switch unit connected in series. The third phase bridge arm includes a fifth power switch unit and a sixth power switch unit connected in series. An input terminal of the first power switch unit, an input terminal of the third power switch unit, and an input terminal of the fifth power switch unit are connected together to form a first bus terminal and are connected with the first end of the capacitor C1. An output terminal of the second power switch unit, an output terminal of the fourth power switch unit, and an output terminal of the sixth power switch unit are connected together to form a second bus terminal and are connected with the second end of the capacitor C1. The first power switch unit includes a first upper bridge arm VT1 and a first upper bridge diode VD1. The second power switch unit includes a second lower bridge arm VT2 and a second lower bridge diode VD2. The third power switch unit includes a third upper bridge arm VT3 and a third upper bridge diode VD3. The fourth power switch unit includes a fourth lower bridge arm VT4 and a fourth lower bridge diode VD4. The fifth power switch unit includes a fifth upper bridge arm VT5 and a fifth upper bridge diode VD5. The sixth power switch unit includes a sixth lower bridge arm VT6 and a sixth lower bridge diode VD6. The motor coil includes a set of three-phase windings. The first phase coil is connected with a midpoint of the first phase bridge arm. The second phase coil is connected with a midpoint of the second phase bridge arm. The third phase coil is connected with a midpoint of the third phase bridge arm. The first phase coil, the second phase coil, and the third phase coil are connected together to form a neutral point. A neutral line is led out from the neutral point. The energy conversion apparatus further includes a switch K4, a switch K5, an inductor L, and a capacitor C2. A first end of the charging and discharging port is connected with a second end of the inductor L and a first end of the capacitor C2. The first end of the inductor L is connected with a second end of the switch K4. A first end of the switch K4 is connected with the neutral line. A second end of the charging and discharging port 104 is connected with a second end of the switch K5. A first end of the switch K5 and a second end of the capacitor C2 are connected together at the second bus terminal.

Figure 22:
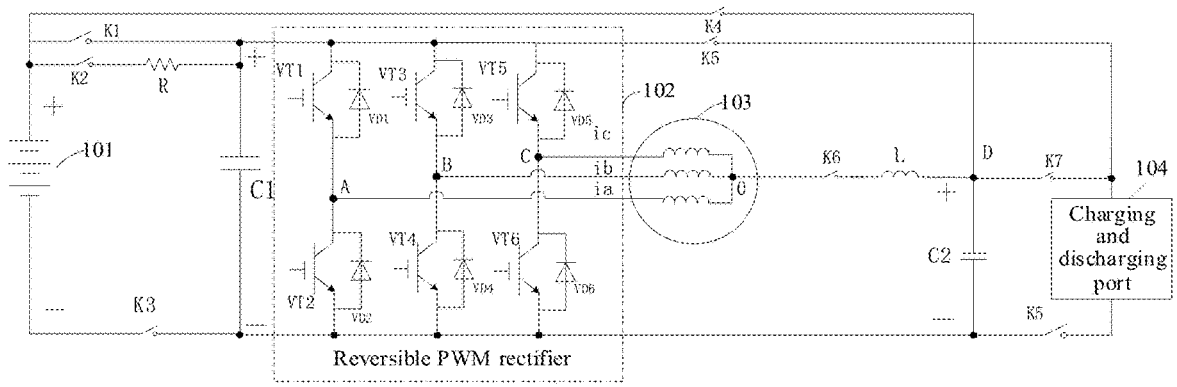
FIG. 22 is another circuit diagram of an energy conversion apparatus according to Embodiment I of the disclosure.

As shown in FIG. 22, a difference between FIG. 22 and FIG. 21 is that the first end of the charging and discharging port 104 is connected with a second end of a switch K7 and the second end of the switch K5. A first end of the switch K7 is connected with the second end of the inductor L and the first end of the capacitor C2. The first end of the inductor L is connected with a second end of a switch K6. A first end of the switch K6 is connected with the neutral line. The second end of the charging and discharging port 104 is connected with the second end of the capacitor C2 and the second bus terminal. The first end of the switch K4 is connected with the positive electrode of the battery. The first end of the switch K5 is connected with the first end of the capacitor C1.

Figure 23:
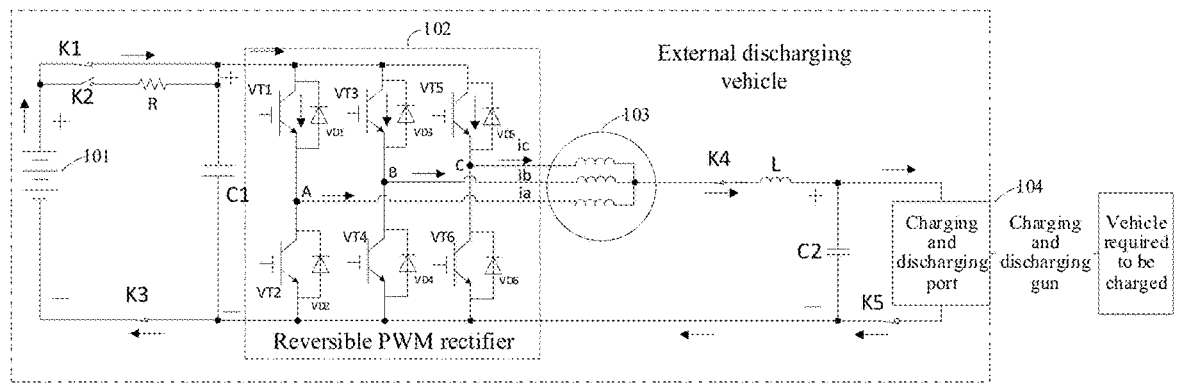
FIG. 23 is another current flow diagram of the energy conversion apparatus according to Embodiment I of the disclosure.
Figure 24:
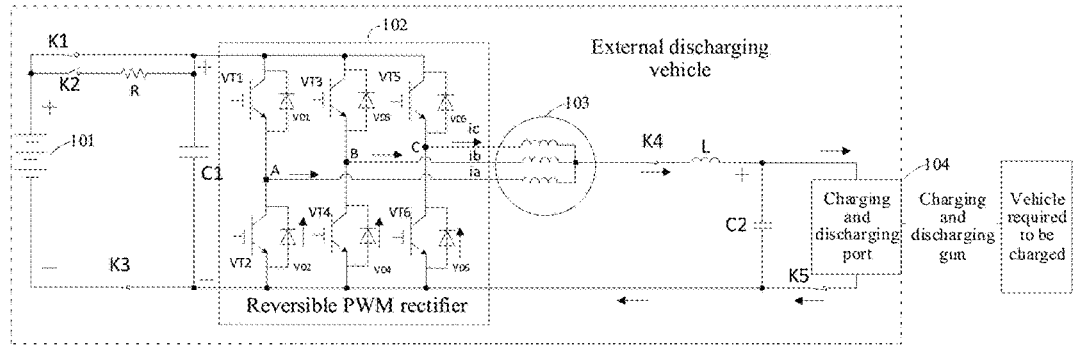
FIG. 24 is another current flow diagram of the energy conversion apparatus according to Embodiment I of the disclosure.

As shown in FIG. 23 and FIG. 24, when the energy conversion apparatus is connected with an external vehicle, an energy storage process and a stored energy release process are performed.

An implementation of a current flow direction after the solving of the target driving power and the target charging and discharging power when the target driving power and the target charging and discharging power are acquired is described below by using FIG. 25 as an example.

Figure 25:
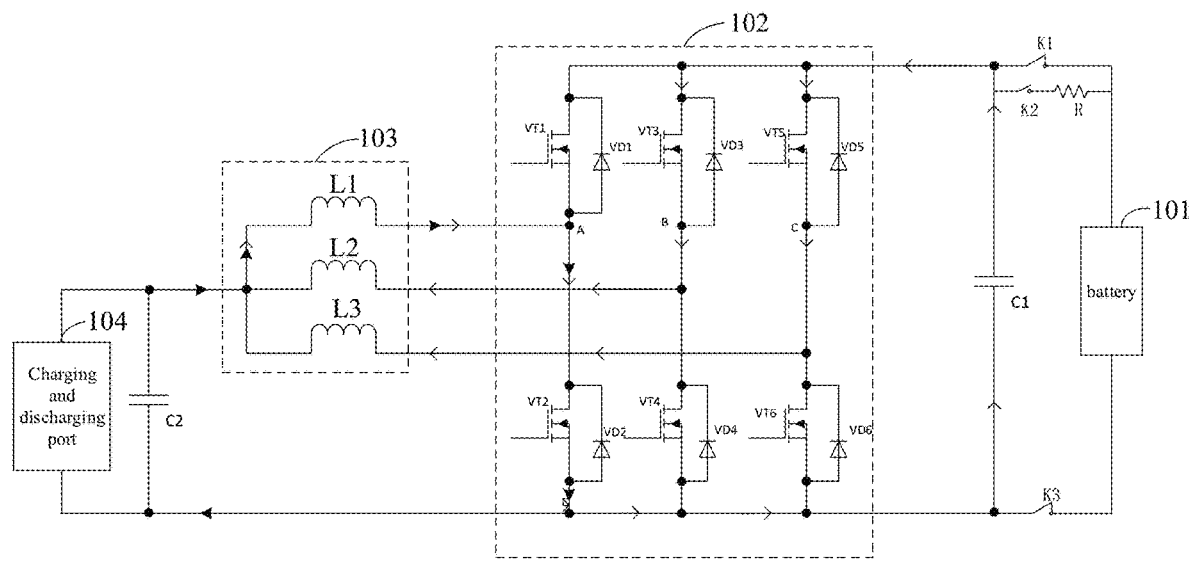
FIG. 25 is another current flow diagram of the energy conversion apparatus according to Embodiment I of the disclosure.

As shown in FIG. 25, the reversible PWM rectifier 102 includes the first power switch unit, the second power switch unit, the third power switch unit, the fourth power switch unit, the fifth power switch unit, and the sixth power switch unit. A control end of each power switch unit is connected with a controller. The first power switch unit and the second power switch unit in the reversible PWM rectifier 102 form the first phase bridge arm. The third power switch unit and the fourth power switch unit form the second phase bridge arm. The fifth power switch unit and the sixth power switch unit form the third phase bridge arm. The first power switch unit includes the first upper bridge arm VT1 and the first upper bridge diode VD1. The second power switch unit includes the second lower bridge arm VT2 and the second lower bridge diode VD2. The third power switch unit includes the third upper bridge arm VT3 and the third upper bridge diode VD3. The fourth power switch unit includes the fourth lower bridge arm VT4 and the fourth lower bridge diode VD4. The fifth power switch unit includes the fifth upper bridge arm VT5 and the fifth upper bridge diode VD5. The sixth power switch unit includes the sixth lower bridge arm VT6 and the sixth lower bridge diode VD6. The first power switch unit, the third power switch unit, and the fifth power switch unit are connected together to form the first bus terminal. The second power switch unit, the fourth power switch unit, and the sixth power switch unit are connected together to form the second bus terminal. The bus capacitor C1 is connected between the first bus terminal and the second bus terminal. A first end of the bus capacitor C1 is connected with the first end of the switch K1 and the first end of the switch K2. A second end of the bus capacitor C1 is connected with the first end of the switch K3. The second end of the switch K2 is connected with the first end of the resistor R. The second end of the switch K1 is connected with the second end of the resistor R and a positive electrode end of the battery 101. The second end of the switch K3 is connected with a negative electrode end of the battery 101. A motor includes the first phase coil L1, the second phase coil L2, and the third phase coil L3. One ends of the phase coils are connected together to form the neutral points to be connected to a DC power supply device, and the other ends of the phase coils are respectively connected with the midpoint of one of a plurality of phase bridge arms. A DC energy storage circuit is formed by the DC power supply device, the first phase coil L1, and the second power switch. The DC energy storage circuit is used for charging, energy storage, and driving. In an implementation, a current flow direction is from a positive electrode of the DC power supply device through the first phase coil L1 and the second lower bridge arm VT2 to a negative electrode of the DC power supply device. A battery charging circuit is formed by the DC power supply device, the first phase coil L1, the first power switch, the bus capacitor C1, and the external battery. The battery charging circuit is used for energy storage and driving. A current flow direction is from the positive electrode of the DC power supply device through the first phase coil L1, the first upper bridge arm VT1, the battery 101, and the bus capacitor C1 to the negative electrode of the DC power supply device. A first driving circuit of the motor is formed by the bus capacitor C1, a fifth power switch, a third power switch, the third phase coil L3, the second phase coil L2, the first phase coil L1, and the second power switch. A current flows from one end of the bus capacitor C1 through the third upper bridge arm VT3, the second phase coil L2, the first phase coil L1, and the second lower bridge arm VT2 to another end of the bus capacitor C1 while flowing from one end of the bus capacitor C1 through the fifth upper bridge arm VT5, the third phase coil L3, the first phase coil L1, and the second lower bridge arm VT2 to another end of the bus capacitor C1. A second driving circuit of the motor is formed by the second phase coil L2, the third phase coil L3, the first phase coil L1, the first power switch, the third power switch, and the fifth power switch. A loop current is formed by the current flow direction respectively among the second phase coil L2, the first phase coil L1, the first upper bridge diode VD1, and the third upper bridge arm VT3 and among the third phase coil L3, the first phase coil L1, the first upper bridge diode VD1, and the fifth upper bridge arm VT5. A DC energy storage circuit is formed by the DC power supply device, the first phase coil L1, the second phase coil L2, the second power switch, and a fourth power switch. The DC energy storage circuit is used for energy storage and driving. In an implementation, the current flow direction is from the positive electrode of the DC power supply device through the first phase coil L1 and the second lower bridge arm VT2 to the negative electrode of the DC power supply device, and also from the positive electrode of the DC power supply device through the second phase coil L2 and the fourth lower bridge arm VT4 to the negative electrode of the DC power supply device. The battery charging circuit is formed by the DC power supply device, the first phase coil L1, the second phase coil L2, the first power switch, the third power switch, the bus capacitor C1, and the external battery. The battery charging circuit is used for energy storage and driving. The current flow direction is from the positive electrode of the DC power supply device through the first phase coil L1, the first upper bridge diode VD1, the battery 101, and the bus capacitor C1 to the negative electrode of the DC power supply device, and also from the positive electrode of the DC power supply device through the second phase coil L2, the second upper bridge diode VD3, the battery 101, and the bus capacitor C1 to the negative electrode of the DC power supply device. The first driving circuit of the motor is formed by the bus capacitor C1, the fifth power switch, the third phase coil L3, the first phase coil L1, the second phase coil L2, the second power switch, and the fourth power switch. The current flows from one end of the bus capacitor C1 through the fifth upper bridge arm VT5, the third phase coil L3, the first phase coil L1, and the second lower bridge arm VT2 to another end of the bus capacitor C1, and also from one end of the bus capacitor C1 through the fifth upper bridge arm VT5, the third phase coil L3, the second phase coil L2, and the fourth lower bridge arm VT4 to another end of the bus capacitor C1. The second driving circuit of the motor is formed by the third phase coil L3, the first phase coil L1, the second phase coil L2, the first power switch, the third power switch, and the fifth power switch. A loop current is formed by the current flow direction respectively among the third phase coil L3, the first phase coil L1, the first upper bridge diode VD1, and the fifth upper bridge arm VT5, and among the third phase coil L3, the second phase coil L2, the third upper bridge diode VD3, and the third upper bridge arm VT3.

For the DC power supply, when a first coil is the first phase coil L1, and a second coil is the second phase coil L2 and the third phase coil L3, as shown in FIG. 25, in a first working stage, the controller controls, according to a driving power of the motor and a charging power of the battery, a moment and a duration for which a first bridge arm is connected with a second bridge arm, to cause a current outputted by the DC power supply device in the DC energy storage circuit to successively flow through the first phase coil L1 and the second power switch to the DC power supply device, and also cause a current outputted by the bus capacitor C1 in the first driving circuit of the motor to successively flow through the fifth power switch, the third power switch, the third phase coil L3, the second phase coil L2, the first phase coil L1, and the second power switch to the bus capacitor C1. In this way, the DC energy storage circuit and the first driving circuit of the motor can work simultaneously.

Figure 26:
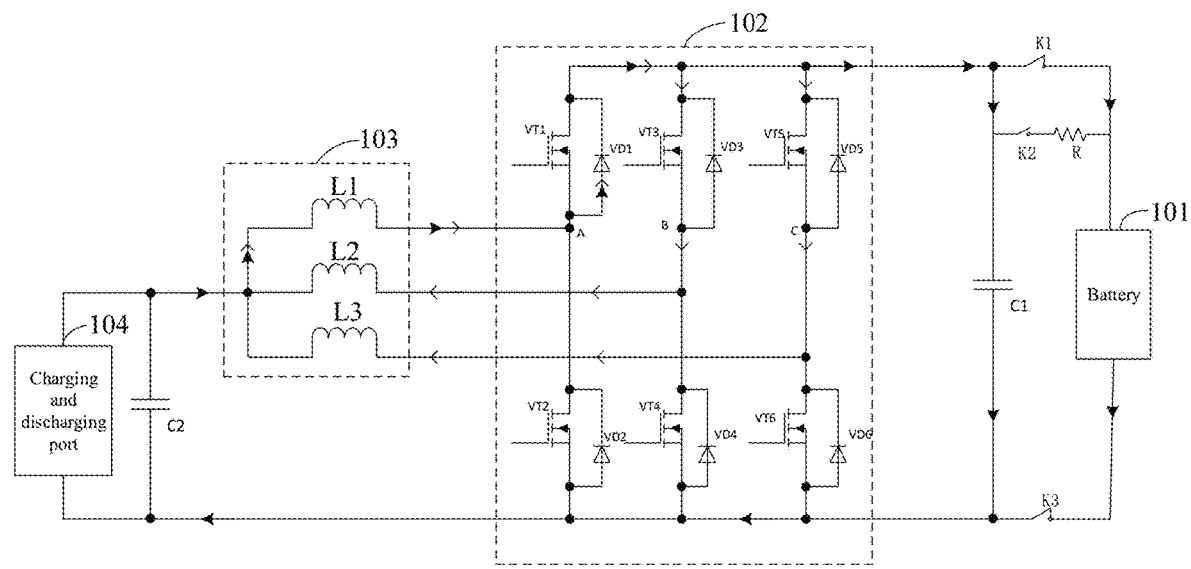
FIG. 26 is another current flow diagram of the energy conversion apparatus according to Embodiment I of the disclosure.

As shown in FIG. 26, in a second working stage, the controller controls the moment and the duration for which the first bridge arm is connected with the second bridge arm, to cause the current outputted by the DC supply device in the battery charging circuit to flow through the first phase coil L1, the first power switch, the bus capacitor C1, and the battery to the DC charging device. In this way, the current outputted by the second phase coil L2 and the third phase coil L3 in the second driving circuit of the motor can flow through the first phase coil L1, the first power switch, the third power switch, and the fifth power switch to the second phase coil L2 and the third phase coil L3, to cause the battery charging circuit and the second driving circuit of the motor to work simultaneously.

Figure 27:
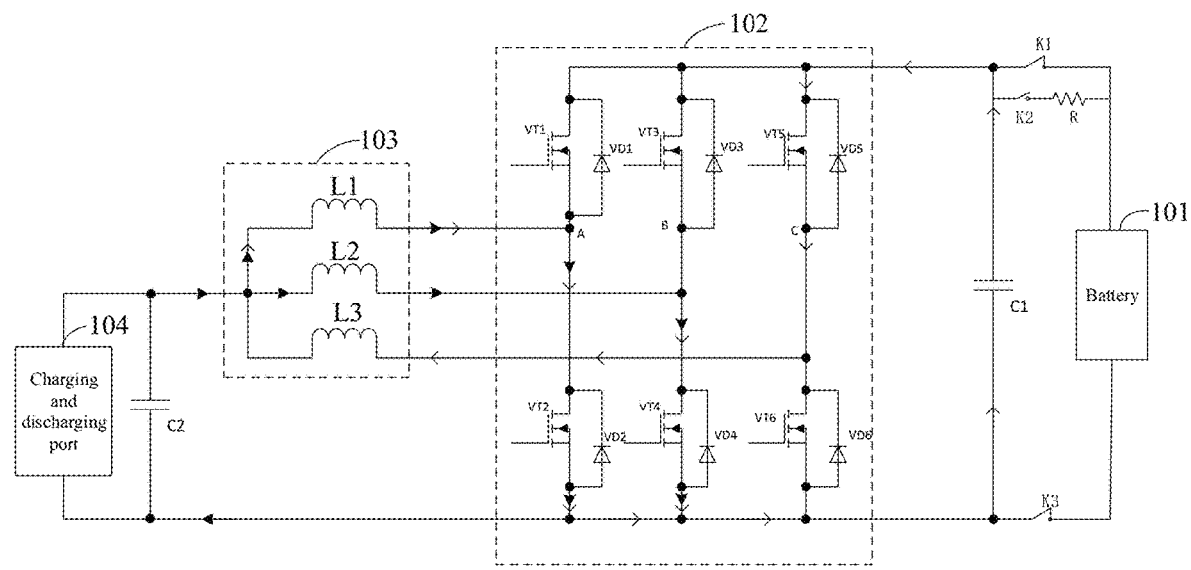
FIG. 27 is another current flow diagram of the energy conversion apparatus according to Embodiment I of the disclosure.

For the DC power supply, when the first coil is the first phase coil L1 and the second phase coil L2, and the second coil is the third phase coil L3, as shown in FIG. 27, in the first working stage, the controller controls the connected moment and duration of a first bridge arm and a second bridge arm according to the driving power of the motor and the charging power of the battery, to cause the current outputted by the DC power supply device in the DC energy storage circuit to successively flow through the first phase coil L1, the second phase coil L2, the second power switch, and the fourth power switch to the DC power supply device, and also cause the current outputted by the bus capacitor C1 in the first driving circuit of the motor to successively flow through the fifth power switch, the third phase coil L3, the second phase coil L2, the first phase coil L1, the second power switch, and the fourth power switch to the bus capacitor C1. In this way, the DC energy storage circuit and the first driving circuit of the motor can work simultaneously.

Figure 28:
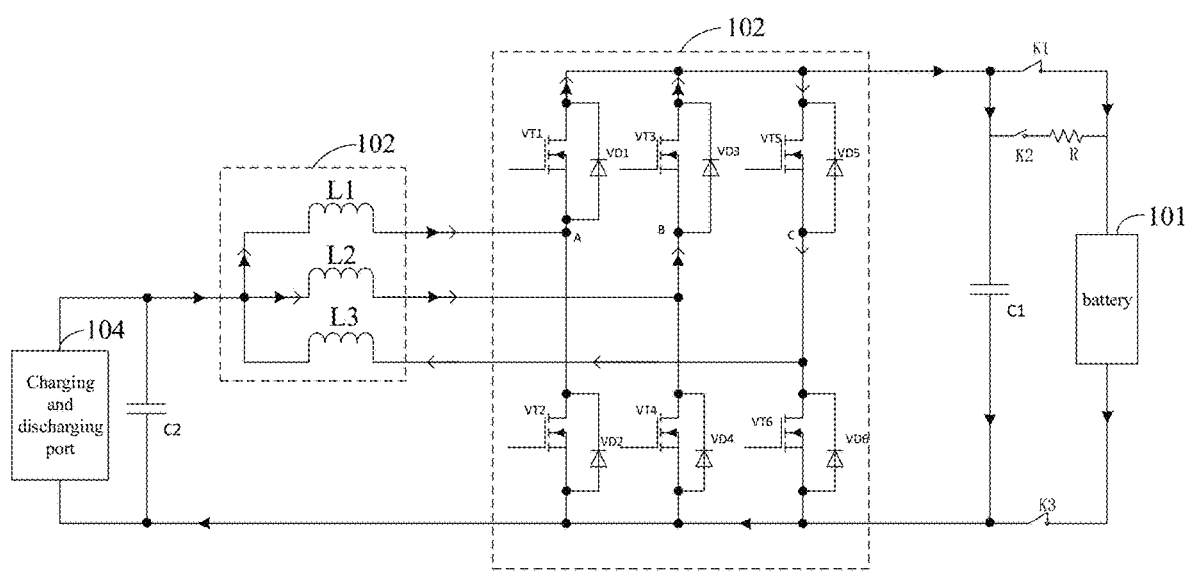
FIG. 28 is another current flow diagram of the energy conversion apparatus according to Embodiment I of the disclosure.

As shown in FIG. 28, in the second working stage, the controller 104 controls the moment and the duration for which the first bridge arm is connected with the second bridge arm, to cause the current outputted by the DC supply device in the battery charging circuit to flow through the first phase coil L1, the second phase coil L2, the first power switch, the third power switch, the bus capacitor C1, and the battery to the DC charging device. In this way, the current outputted by the third phase coil L3 in the second driving circuit of the motor can flow through the first phase coil L1, the second phase coil L2, the first power switch, the third power switch, and the fifth power switch to the third phase coil L3, to cause the battery charging circuit and the second driving circuit of the motor to work simultaneously.

The above implementation merely relates to embodiments of the cooperative working of the charging process and the driving process. The heating process is similar to the driving process. The first driving circuit of the motor and the second driving circuit of the motor may also be a first heating circuit and a second heating circuit. When the target heating power, the target driving power, and the target charging and discharging power are simultaneously received, the battery charging circuit, the first driving circuit of the motor, and the first heating circuit can be controlled to work simultaneously, and the battery charging circuit, the second driving circuit of the motor, and the second heating circuit can be controlled to work simultaneously.

Figure 29:
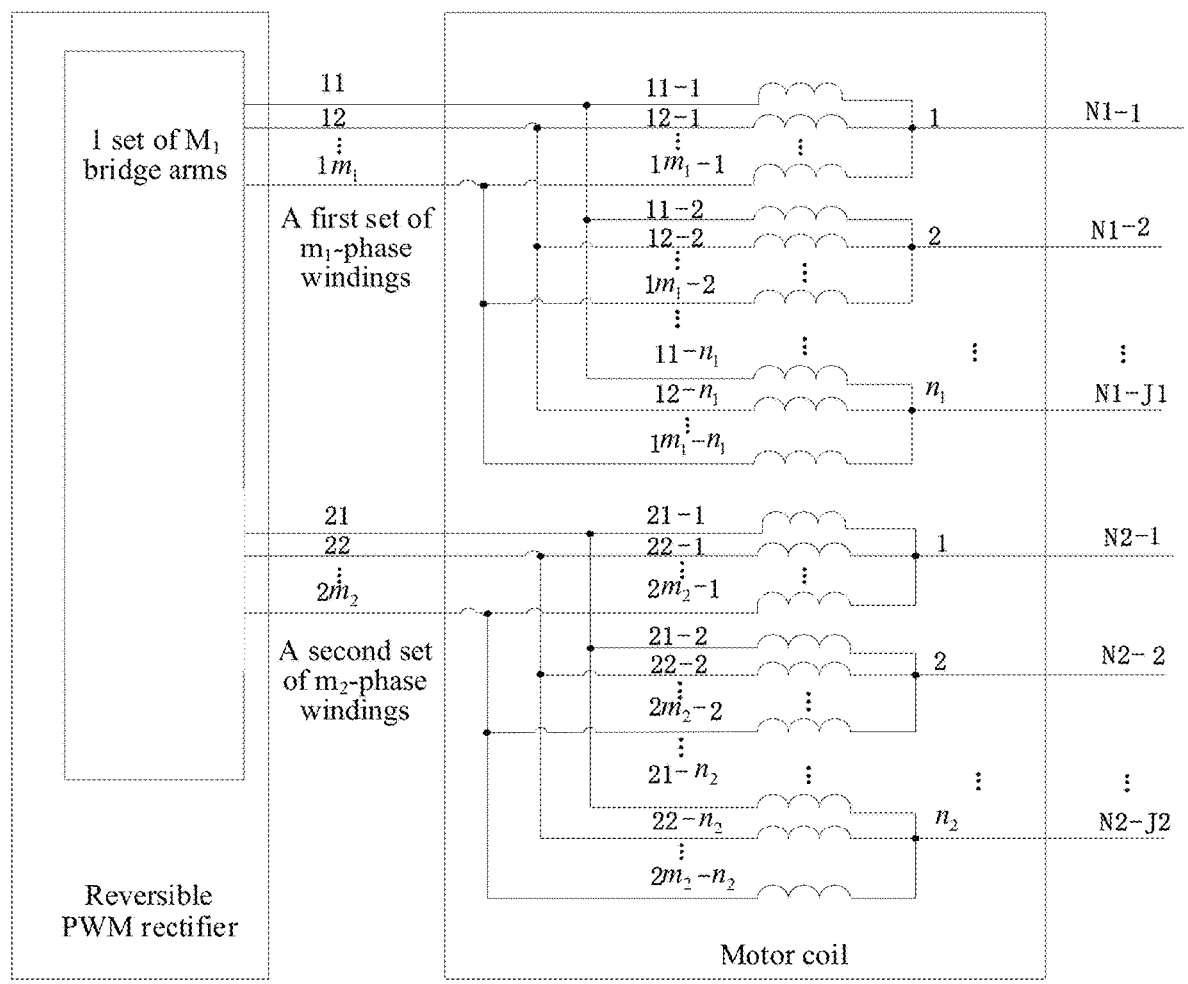
FIG. 29 is a schematic structural diagram of a motor coil of an energy conversion apparatus according to Embodiment I of the disclosure.

As shown in FIG. 29, the motor may have a plurality of sets of winding units. All phase windings of each set of winding units are used as a basic unit. The motor can be controlled to independently operate by motor vector control for each basic unit. The reversible PWM rectifier 102 includes a set of $M_1$ bridge arms. A first bus terminal and a second bus terminal are formed by the $M_1$ bridge arms. The positive electrode end and the negative electrode end of a power battery 101 are respectively connected with the first bus terminal and the second bus terminal. The motor coil 103 includes a first winding unit and a second winding unit.

The first winding unit includes a set of $m_1$-phase windings. Each phase winding in the $m_1$-phase windings includes $n_1$ coil branches. The $n_1$ coil branches of each phase winding are connected together to form a phase endpoint. The phase endpoints of the $m_1$-phase windings are connected in a one-to-one correspondence with a midpoint of each of $m_1$ bridge arms in the $M_1$ bridge arms. One of the $n_1$ coil branches of each of the $m_1$-phase windings is also connected with one of the $n_1$ coil branches in other phase windings to form $n_1$ connection points. The $n_1$ connection points form $T_1$ neutral points. $J_1$ neutral lines are led out from $T_1$ neutral points, where $n_1 \geq T_1 \geq 1$, $T_1 \geq J_1 \geq 1$, $m_1 \geq 2$, and $n_1$, $m_1$, $T_1$, and $J_1$ are all positive integers.

The second winding unit includes a set of $m_2$-phase windings. Each of the $m_2$-phase windings includes $n_2$ coil branches. The $n_2$ coil branches of each phase winding are connected together to form a phase endpoint. The phase endpoints of the $m_2$-phase windings are connected in a one-to-one correspondence with a midpoint of each of the $m_2$ bridge arms in the $M_1$ bridge arms. One of the $n_2$ coil branches of each of $m_2$-phase windings is also connected with one of the $n_2$ coil branches in other phase windings to form $n_2$ connection points. The $n_2$ connection points form $T_2$ neutral points. $J_2$ neutral lines are led out from the $T_2$ neutral points, where $n_2 \geq T_2 \geq 1$, $T_2 \geq J_2 \geq 1$, $m_2 \geq 2$, $M \geq m1+m2$, and $n_2$, $m_2$, $T_2$, and $J_2$ are all positive integers.

Figure 30:
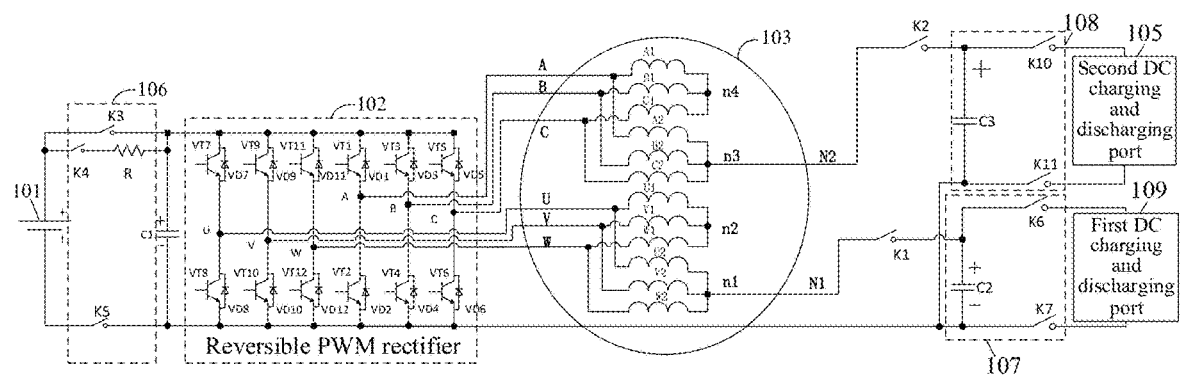
FIG. 30 is another circuit diagram of an energy conversion apparatus according to Embodiment I of the disclosure.

FIG. 30 is a circuit diagram of an energy conversion apparatus according to this implementation. By using $m_1=m_2=3$, $M_1=6$, and $n_1=n_2=2$ as an example, the energy conversion apparatus includes the reversible PWM rectifier 102, the motor coil 103, and a first switch module 106. The first switch module 106 includes a switch K3, a switch K4, a resistor R, a switch K5, and a capacitor C1. A positive electrode of an external battery is connected with a first end of the switch K3 and a first end of the switch K4. A second end of the switch K4 is connected with a first end of the resistor R. A second end of the switch K3 and a second end of the resistor R are connected with a first end of the capacitor C1. A negative electrode of the battery is connected with a first end of the switch K5. A second end of the switch K5 is connected with a second end of the capacitor C1. The reversible PWM rectifier 102 includes six phase bridge arms. A first phase bridge arm includes a first power switch unit and a second power switch unit connected in series. A second phase bridge arm includes a third power switch unit and a fourth power switch unit connected in series. A third phase bridge arm includes a fifth power switch unit and a sixth power switch unit connected in series. A fourth phase bridge arm includes a seventh power switch unit and an eighth power switch unit connected in series. A fifth phase bridge arm includes a ninth power switch unit and a tenth power switch unit connected in series. A sixth phase bridge arm includes an eleventh power switch unit and a twelfth power switch unit connected in series. An input terminal of the first power switch unit, an input terminal of the third power switch unit, an input terminal of the fifth power switch unit, an input terminal of the seventh power switch unit, an input terminal of the ninth power switch unit, and an input terminal of the eleventh power switch unit are connected together to form a first bus terminal to be connected with the first end of the capacitor C1. An output terminal of the second power switch unit, an output terminal of the fourth power switch unit, an output terminal of the sixth power switch unit, an output terminal of the eighth power switch unit, an output terminal of the tenth power switch unit, and an output terminal of the twelfth power switch unit are connected together to form a second bus terminal to be connected with the second end of the capacitor C1. The first power switch unit includes a first upper bridge arm VT1 and a first upper bridge diode VD1. The second power switch unit includes a second lower bridge arm VT2 and a second lower bridge diode VD2. The third power switch unit includes a third upper bridge arm VT3 and a third upper bridge diode VD3. The fourth power switch unit includes a fourth lower bridge arm VT4 and a fourth lower bridge diode VD4. The fifth power switch unit includes a fifth upper bridge arm VT5 and a fifth upper bridge diode VD5. The sixth power switch unit includes a sixth lower bridge arm VT6 and a sixth lower bridge diode VD6. The seventh power switch unit includes a seventh upper bridge arm VT7 and a seventh upper bridge diode VD7. The eighth power switch unit includes an eighth lower bridge arm VT8 and an eighth lower bridge diode VD8. The ninth power switch unit includes a ninth upper bridge arm VT9 and a ninth upper bridge diode VD9. The tenth power switch unit includes a tenth lower bridge arm VT10 and a tenth lower bridge diode VD10. The eleventh power switch unit includes an eleventh upper bridge arm VT11 and an eleventh upper bridge diode VD11. The twelfth power switch unit includes a twelfth lower bridge arm VT12 and a twelfth lower bridge diode VD12. A first winding unit includes a set of three-phase windings. Each phase winding includes two coil branches. A coil U1 and a coil U2 in the first phase coil are connected together with a midpoint U of the fourth phase bridge arm. A coil V1 and a coil V2 in the second phase coil are connected together with a midpoint V of the fifth phase bridge arm. A coil W1 and a coil W2 in the third phase coil are connected together with a midpoint W of the sixth phase bridge arm. The coil U2, the coil V2, and the coil W2 are connected together to form a first connection point n1. A first independent neutral point is formed by the first connection point n1. A first neutral line is led out from the first independent neutral point. The coil U1, the coil V1, and the coil W1 are connected together to form a second connection point n2. A second independent neutral point is formed by the second connection point n2. The second winding unit includes a set of three-phase windings. Each phase winding includes two coil branches. A coil A1 and a coil A2 in the first phase coil are connected together with a midpoint A of the first phase bridge arm. A coil B1 and a coil B2 in the second phase coil are connected together with a midpoint B of the second phase bridge arm. A coil C1 and a coil C2 in the third phase coil are connected together with a midpoint C of the third phase bridge arm. The coil A1, the coil B1, and the coil C1 are connected together to form a fourth connection point n4. The coil A2, the coil B2, and the coil C2 are connected together to form a third connection point n3. A third independent neutral point is formed by the third connection point n3. A second neutral line is led out from the third independent neutral point. The energy conversion apparatus further includes a switch K1, a switch K2, a second switch module 107, and a third switch module 108. The second switch module 107 includes a switch K6, a switch K7, and a capacitor C2. The third switch module 108 includes a switch K10, a switch K11, and a capacitor C3. A first end and a second end of an external first DC charging and discharging port 109 are respectively connected with a second end of the switch K6 and a second end of the switch K7. A first end of the switch K6 is connected with the second end of the switch K1 and a first end of the capacitor C2. The first end of the switch K1 is connected with a first neutral line. A first end of the switch K7 is connected with a second end of the capacitor C2 and the second bus terminal of the reversible PWM rectifier 102. The second neutral line is connected with the first end of the switch K2. The second end of the switch K2 is connected with a first end of the capacitor C3 and a first end of the switch K10. A second end of the switch K10 is connected with a first end of a second DC charging and discharging port 105. A second end of the capacitor C3 is connected with a first end of the switch K11 and the second bus terminal. A second end of the switch K11 is connected with a second end of the second DC charging and discharging port 105.

In this implementation, the first DC charging and discharging port 109 and the second DC charging and discharging port 105 are respectively connected with the first neutral line and the second neutral line. In this way, a heating circuit may be formed by the first DC charging and discharging port, the first winding unit, and the reversible PWM rectifier 102, a heating circuit may be formed by the second DC charging and discharging port, the second winding unit, and the reversible PWM rectifier 102, and a charging and discharging circuit may further be formed by the first DC charging and discharging port 109 and the second DC charging and discharging port 105 with the power battery 101 through the energy conversion apparatus.

Figure 31:
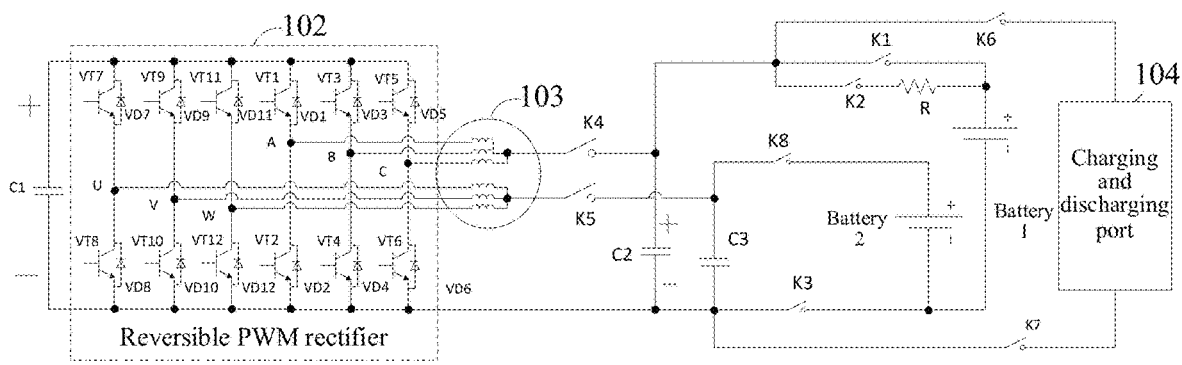
FIG. 31 is another circuit diagram of an energy conversion apparatus according to Embodiment I of the disclosure.

As shown in FIG. 31, a difference between the figure and FIG. 30 is that the first neutral line led out from the first winding unit is connected with the first end of the capacitor C3 and the first end of the switch K8 by using the switch K5. The second end of the capacitor C2, the second end of the capacitor C3, the first end of the switch K3, a negative electrode of a first battery, a negative electrode of a second battery, and the first end of the switch K7 are connected together. The second neutral line led out from the second winding unit is connected with the first end of the switch K4. The second end of the switch K4 is connected with the first end of the capacitor C2, the first end of the switch K1, the first end of the switch K2, and the first end of the switch K6. The second end of the switch K2 is connected with the first end of the resistor R. The second end of the resistor R is connected with the second end of the switch K1 and the positive electrode of the first battery. The second end of the switch K8 is connected with the positive electrode of the second battery.

Figure 32:
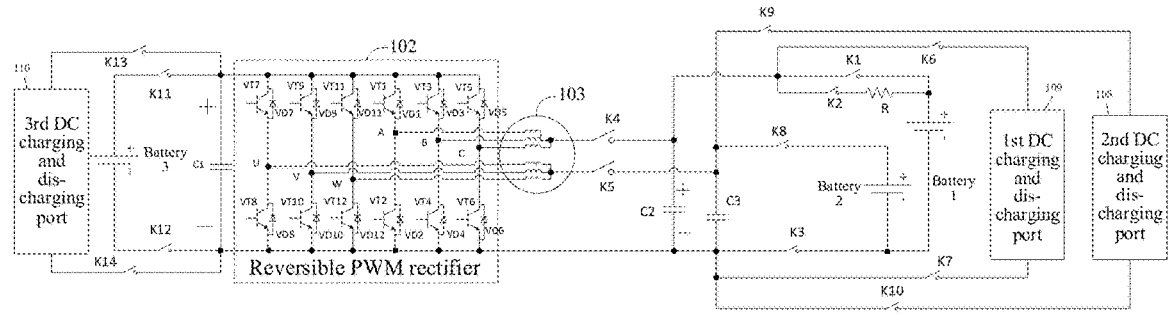
FIG. 32 is another circuit diagram of an energy conversion apparatus according to Embodiment I of the disclosure.

As shown in FIG. 32, a difference between the figure and FIG. 30 is that the second DC charging and discharging port 105 is connected with the first end and the second end of the capacitor C3 by using the switch K9 and the switch K10. A third DC charging and discharging port 110 is connected with the first end and the second end of the capacitor C1 by using the switch K13 and the switch K14.

Embodiment V of the disclosure provides a computer-readable storage medium. The computer-readable storage medium stores a computer program. When the computer program is executed by a processor, steps of the method in Embodiment I to Embodiment IV are implemented.

A person of ordinary skill in the art may understand that all or some of the procedures of the methods in the foregoing embodiments may be implemented by a computer program instructing relevant hardware. The computer program may be stored in a non-volatile computer-readable storage medium. When the program is executed, the procedures of the foregoing method embodiments may be performed. Any reference to a memory, a storage, a database, or another medium used in the embodiments provided in this application can include a non-volatile and/or volatile memory. The non-volatile memory may include a ROM, a programmable ROM (PROM), an electrically programmable ROM (EPROM), an electrically erasable programmable ROM (EEPROM), or a flash memory. The volatile memory may include a random access memory (RAM) or an external high-speed cache. By way of description rather than limitation, the RAM may be obtained in a plurality of forms, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), a rambus direct RAM (RDRAM), a direct rambus dynamic RAM (DRDRAM), and a rambus dynamic RAM (RDRAM).

A person skilled in the art may clearly understand that, for convenient and concise description, the above functional modules are only described for exemplary purposes. In actual applications, the above functions may be allocated to different functional modules as required, which means that the internal structure of the apparatus is divided into different functional modules to complete all or some of the above described functions.

Embodiment VI of the disclosure provides a cooperative control apparatus for an energy conversion apparatus. The energy conversion apparatus includes a reversible PWM rectifier and a motor coil. The reversible PWM rectifier is connected with the motor coil. A positive electrode end and a negative electrode end of an external battery are respectively connected with a first bus terminal and a second bus terminal of the reversible PWM rectifier. A first end and a second end of an external charging and discharging port are respectively connected with at least one neutral line led out from the motor coil and the second bus terminal of the reversible PWM rectifier.

The cooperative control apparatus includes:
a power acquisition module, configured to acquire a target heating power, a target driving power, and a target charging and discharging power;
a first heating power calculation module, configured to: acquire, according to the target charging and discharging power, a target charging and discharging current outputted by the external charging and discharging port, and acquire a first heating power of the motor coil according to the target charging and discharging current;
a second heating power calculation module, configured to acquire, according to the target driving power, a first quadrature axis current and a first direct axis current in a synchronous rotating reference frame based on a motor rotor field orientation, and acquire a second heating power of the motor coil according to the first quadrature axis current and the first direct axis current;
a target current acquisition module, configured to: adjust the first quadrature axis current and the first direct axis current to a target quadrature axis current and a target direct axis current according to the target driving power when a difference between a sum of the first heating power and the second heating power and the target heating power is not within a preset range, to cause the difference between the sum of the first heating power and the second heating power and the target heating power to be within the preset range, and respectively set the first quadrature axis current and the first direct axis current as the target quadrature axis current and the target direct axis current when the difference between the sum of the first heating power and the second heating power and the target heating power is within the preset range; and
a duty cycle acquisition module, configured to acquire a sampling current value on each phase coil and a motor rotor position, and calculate a duty cycle of each phase bridge arm in the reversible PWM rectifier according to the target quadrature axis current, the target direct axis current, the target charging and discharging current, the sampling current value on each phase coil, and the motor rotor position.

Embodiment VII of the disclosure provides a vehicle. The vehicle further includes the energy conversion apparatus provided in Embodiment VI.

Figure 33:
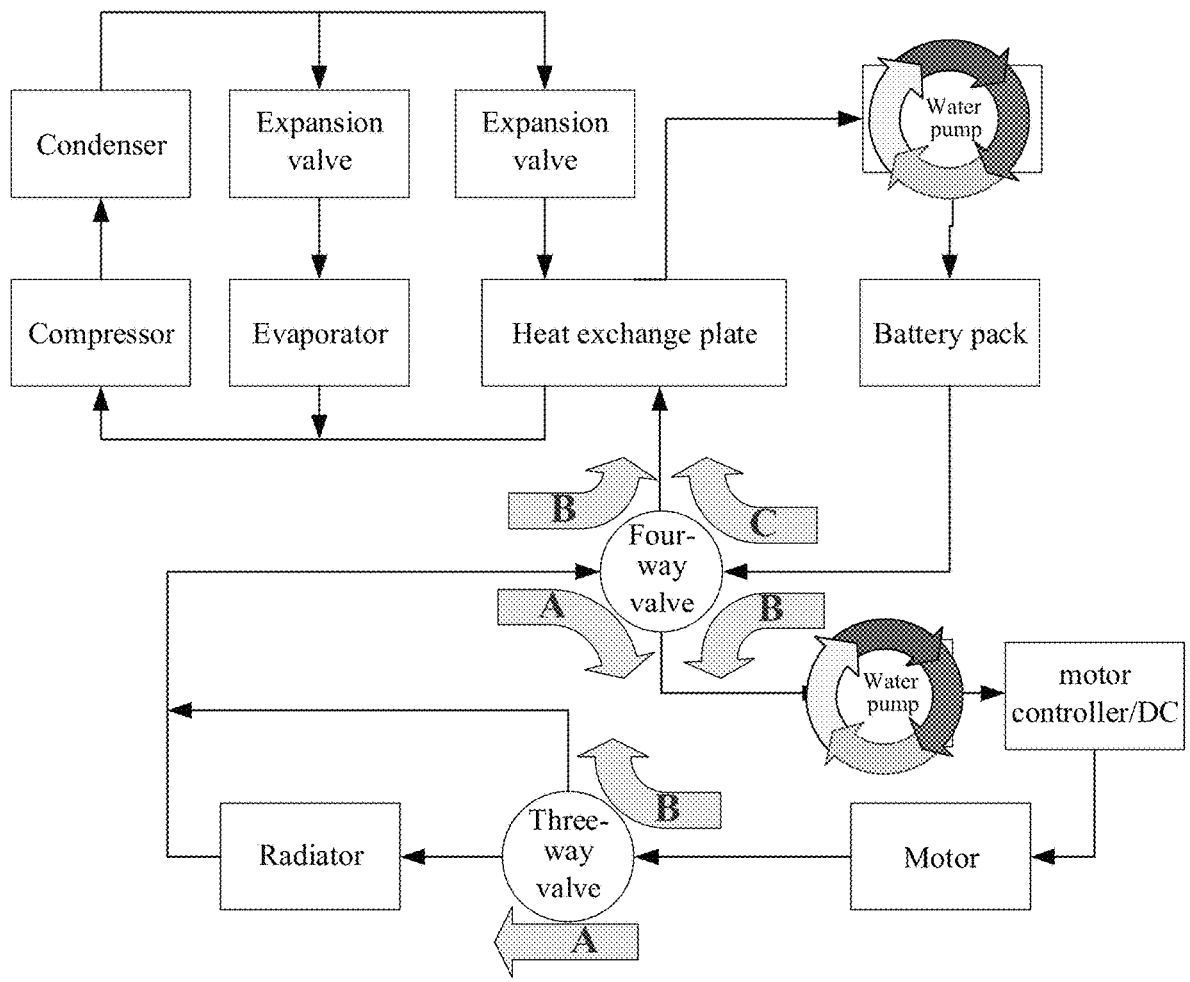
FIG. 33 is a schematic structural diagram of a vehicle according to Embodiment VII of the disclosure.

As shown in FIG. 33, a heating and cooling circuit of a battery pack includes the following circuits: a motor driving system cooling circuit, a battery cooling system circuit, and an air conditioning system cooling circuit. The battery cooling system circuit is integrated with the air conditioning cooling system by using a heat exchange plate. The battery cooling system circuit is connected with the motor driving system cooling circuit by using a four-way valve. The motor driving system cooling circuit turns on and off a radiator through switching of a three-way valve. The motor driving system cooling circuit and the battery cooling system circuit are switched by using a valve body to change a flow direction of the cooling liquid in a pipeline, so that the cooling liquid heated by a motor driving system flows to a battery cooling system, so as to complete the heat transfer from the motor driving system to the battery cooling system. When the motor driving system is in a non-heating mode, through the switching between the three-way valve and the four-way valve, the cooling liquid of the motor driving system passes through a circuit A, and the cooling liquid of the battery cooling system passes through a circuit C. When the motor is in a heating mode, through the switching between the three-way valve and the four-way valve, the cooling liquid of the motor driving system passes through a circuit B, so that the cooling liquid heated by the motor driving system flows to the cooling circuit of the battery pack to heat the battery.

In the description of this application, it should be understood that orientation or position relationships indicated by the terms such as "center", "longitudinal", "transverse", "length", "width", "thickness", "on", "below", "front", "back", "left", "right", "vertical", "horizontal", "top", "bottom", "inside", "outside", "clockwise", "anticlockwise", "axial direction", "radial direction", and "circumferential direction" are based on orientation or position relationships shown in the accompanying drawings, and are used only for ease and brevity of illustration and description, rather than indicating or implying that the mentioned apparatus or component needs to have a particular orientation or needs to be constructed and operated in a particular orientation. Therefore, such terms should not be construed as limiting of this application.

In addition, the terms "first" and "second" are used merely for the purpose of description, and shall not be construed as indicating or implying relative importance or implying a quantity of indicated technical features. Therefore, features defining "first" and "second" may explicitly or implicitly include one or more such features. In the description of the disclosure, "a plurality of" means two or more, unless otherwise explicitly specified.

In the description of this application, unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. A person of ordinary skill in the art may understand the specific meanings of the foregoing terms in this application according to specific situations.

In this application, unless otherwise explicitly specified or defined, the first feature being located "above" or "below" the second feature may be the first feature being in a direct contact with the second feature, or the first feature being in an indirect contact with the second feature through an intermediary. Moreover, the first feature "over", "above" and "up" the second feature may be that the first feature is directly above or obliquely above the second feature, or simply indicates that a horizontal height of the first feature is higher than that of the second feature. The first feature "under", "below" and "down" the second feature may be that the first feature is directly below or obliquely below the second feature, or simply indicates that a horizontal height of the first feature is less than that of the second feature.

In the descriptions of this specification, a description of a reference term such as "an embodiment", "some embodiments", "an example", "a specific example", or "some examples" means that a specific feature, structure, material, or characteristic that is described with reference to the embodiment or the example is included in at least one embodiment or example of this application. In this specification, exemplary descriptions of the foregoing terms do not necessarily refer to a same embodiment or example. Moreover, the specific features, structures, materials, or characteristics described may be combined in any one or more embodiments or examples in a suitable manner. In addition, different embodiments or examples described in this specification, as well as features of different embodiments or examples, may be integrated and combined by a person skilled in the art without contradicting each other.

Although the embodiments of this application are shown and described above, it may be understood that the foregoing embodiments are exemplary, and cannot be understood as a limitation to this application. A person of ordinary skill in the art may make changes, modifications, replacements, and variations to the foregoing embodiments without departing from the scope of this application.

What is claimed is:

1. A cooperative control method for an energy conversion apparatus, wherein
   the energy conversion apparatus comprises a reversible pulse width modulation (PWM) rectifier and a motor coil; the reversible PWM rectifier is connected with the motor coil; a positive electrode end and a negative electrode end of an external battery are respectively connected with a first bus terminal and a second bus terminal of the reversible PWM rectifier; a first end and a second end of an external charging and discharging port are respectively connected with at least one neutral line led out from the motor coil and the second bus terminal of the reversible PWM rectifier; and
   the cooperative control method comprises:
   acquiring a target heating power, a target driving power, and a target charging and discharging power;
   acquiring, according to the target charging and discharging power, a target charging and discharging current outputted from the external charging and discharging port to the neutral line, and acquiring a first heating power of the motor coil according to the target charging and discharging current;
   acquiring, according to the target driving power, a first quadrature axis current and a first direct axis current in a synchronous rotating reference frame based on a motor rotor field orientation, and acquiring a second heating power of the motor coil according to the first quadrature axis current and the first direct axis current;
   respectively adjusting the first quadrature axis current and the first direct axis current to a target quadrature axis current and a target direct axis current according to the target driving power, such that a difference between a sum of the first heating power and the second heating power and the target heating power is within a preset range; and
   acquiring a sampling current value on each phase coil and a motor rotor position, and calculating a duty cycle of each phase bridge arm in the reversible PWM rectifier according to the target quadrature axis current, the target direct axis current, the target charging and discharging current, the sampling current value on each phase coil, and the motor rotor position.

2. The cooperative control method according to claim 1, wherein after the acquiring the second heating power of the motor coil according to the first quadrature axis current and the first direct axis current, the method further comprises:
   respectively setting the first quadrature axis current and the first direct axis current as the target quadrature axis current and the target direct axis current, when the difference between the sum of the first heating power and the second heating power and the target heating power is within the preset range.

3. The cooperative control method according to claim 1, wherein
   when the target charging and discharging power is zero, the target charging and discharging current and the first heating power are zero, and the cooperative control method comprises:
   acquiring the target heating power and the target driving power;
   acquiring, according to the target driving power, the first quadrature axis current and the first direct axis current in the synchronous rotating reference frame based on the motor rotor field orientation, and acquiring the second heating power of the motor coil according to the first quadrature axis current and the first direct axis current;
   respectively adjusting the first quadrature axis current and the first direct axis current to the target quadrature axis current and the target direct axis current according to the target driving power, such that a difference between the second heating power and the target heating power is within the preset range;
   respectively setting the first quadrature axis current and the first direct axis current as the target quadrature axis current and the target direct axis current when the difference between the second heating power and the target heating power is within the preset range; and
   acquiring the sampling current value on each phase coil and the motor rotor position, and calculating the duty cycle of each phase bridge arm in the reversible PWM rectifier according to the target quadrature axis current, the target direct axis current, the sampling current value on each phase coil, and the motor rotor position; or when the target heating power is zero, the cooperative control method comprises:
   acquiring the target charging and discharging power and the target driving power;
   acquiring, according to the target charging and discharging power, the target charging and discharging current outputted from the external charging and discharging port to the neutral line;
   acquiring the first quadrature axis current and the first direct axis current according to the target driving power, and respectively setting the first quadrature axis current and the first direct axis current as the target quadrature axis current and the target direct axis current; and
   acquiring the sampling current value on each phase coil and the motor rotor position, and calculating the duty cycle of each phase bridge arm in the reversible PWM rectifier according to the target quadrature axis current, the target direct axis current, the target charging and discharging current, the sampling current value on each phase coil, and the motor rotor position; or when the target driving power is zero, the cooperative control method comprises:
   acquiring the target heating power and the target charging and discharging power;
   acquiring, according to the target charging and discharging power, the target charging and discharging current outputted from the external charging and discharging port to the neutral line, and acquiring the first heating power of the motor coil according to the target charging and discharging current;
   acquiring the target quadrature axis current and the target direct axis current according to the target heating power and the first heating power; and
   acquiring the sampling current value on each phase coil and the motor rotor position, and calculating the duty cycle of each phase bridge arm in the reversible PWM rectifier according to the target quadrature axis current, the target direct axis current, the target charging and discharging current, the sampling current value on each phase coil, and the motor rotor position.

4. The cooperative control method according to claim 1, wherein the acquiring, according to the target charging and discharging power, the target charging and discharging current outputted from the external charging and discharging port to the neutral line comprises:
   acquiring, according to the target charging and discharging power, a target voltage of an external power supply connected to the external charging and discharging port, when the external power supply is in a constant current charging and discharging mode; acquiring an actual voltage of the charging and discharging port, and acquiring a voltage difference according to the target voltage and the actual voltage of the charging and discharging port; and performing closed-loop control on the voltage difference to acquire the target charging and discharging current outputted to the neutral line; or
   acquiring, according to the target charging and discharging power, a current of the external charging and discharging port as the target charging and discharging current outputted from the external charging and discharging port to the neutral line, when the external power supply connected to the external charging and discharging port is in a constant voltage charging and discharging mode.

5. The cooperative control method according to claim 1, wherein the acquiring, according to the target driving power, a first quadrature axis current and a first direct axis current in a synchronous rotating reference frame based on a motor rotor field orientation comprises:
   searching a predetermined torque graph, according to the target driving power, to acquire the first quadrature axis current and the first direct axis current.

6. The cooperative control method according to claim 1, wherein the respectively adjusting the first quadrature axis current and the first direct axis current to a target quadrature axis current and a target direct axis current according to the target driving power, such that the difference between the sum of the first heating power and the second heating power and the target heating power is within the preset range comprises:
   searching a predetermined torque graph to acquire a second quadrature axis current and a second direct axis current, such that the difference between the sum of the first heating power and the second heating power and the target heating power is within the preset range.

7. The cooperative control method according to claim 3, wherein the acquiring the sampling current value on each phase coil and the motor rotor position, and calculating the duty cycle of each phase bridge arm in the reversible PWM rectifier according to the target quadrature axis current, the target direct axis current, the target charging and discharging current, the sampling current value on each phase coil, and the motor rotor position comprises:
   acquiring an actual zero-axis current on the motor coil based on the synchronous rotating reference frame according to the sampling current value on each phase coil, and acquiring an actual quadrature axis current and an actual direct axis current of each set of windings according to the sampling current value on each phase coil and the motor rotor position;
   respectively performing closed-loop control according to the target quadrature axis current and the actual quadrature axis current and according to the target direct axis current and the actual direct axis current, to acquire a direct axis reference voltage and a quadrature axis reference voltage, and acquiring a first duty cycle of each phase bridge arm according to the direct axis reference voltage, the quadrature axis reference voltage, and the motor rotor position;
   acquiring a voltage regulation value of each phase bridge arm according to the target charging and discharging current and the actual zero-axis current, and acquiring a second duty cycle according to the voltage regulation value of each phase bridge arm; and
   calculating the duty cycle of each phase bridge arm according to the first duty cycle of each phase bridge arm and the second duty cycle of each phase bridge arm.

8. The cooperative control method according to claim 7, wherein the acquiring an actual zero-axis current on the motor coil based on the synchronous rotating reference frame according to the sampling current value on each phase coil comprises:
   acquiring the actual zero-axis current of the synchronous rotating reference frame according to the following calculation formula:

$$i0 = \frac{ia + ib + \ldots + im}{m},$$

wherein i0 is the actual zero-axis current, ia, ib . . . im are the sampling current values on the phase coils, and m is a number of motor phases.

9. The cooperative control method according to claim 7 or 8, wherein the acquiring an actual quadrature axis current and an actual direct axis current according to the sampling current value on each phase coil and the motor rotor position comprises:
performing Clark coordinate transformation on the sampling current value on each phase coil to obtain a current value of a stationary reference frame; and
performing Park transformation according to the current value of the stationary reference frame and the motor rotor position to obtain the actual quadrature axis current and the actual direct axis current.

10. The cooperative control method according to claim 9, wherein
the respectively performing closed-loop control according to the target quadrature axis current and the actual quadrature axis current and according to the target direct axis current and the actual direct axis current, to acquire a direct axis reference voltage and a quadrature axis reference voltage comprises:
performing calculation on the target quadrature axis current and the actual quadrature axis current to obtain a quadrature axis current difference, and performing calculation on the target direct axis current and the actual direct axis current to obtain a direct axis current difference; and
respectively performing the closed-loop control on the quadrature axis current difference and the direct axis current difference to obtain the quadrature axis reference voltage and the direct axis reference voltage; and
the acquiring a first duty cycle of each phase bridge arm according to the direct axis reference voltage, the quadrature axis reference voltage, and the motor rotor position comprises:
performing inverse Park coordinate transformation on the quadrature axis reference voltage, the direct axis reference voltage, and the motor rotor position to obtain a voltage of the stationary reference frame; and
performing space vector pulse width modulation on the voltage of the stationary reference frame to obtain the first duty cycle of each phase bridge arm.

11. The cooperative control method according to claim 7, wherein
the acquiring a voltage regulation value of each phase bridge arm according to the target charging and discharging current and the actual zero-axis current on the motor coil comprises:
performing calculation on a target zero-axis current according to the target charging and discharging current and a number of motor phases; and
performing calculation on the actual zero-axis current on the motor coil and the target zero-axis current on the motor coil, and obtaining the voltage regulation value of each phase bridge arm by performing proportional, integral, and differential (PID) control; and
the acquiring a second duty cycle according to the voltage regulation value of each phase bridge arm comprises:
modulating the voltage regulation value and a bus voltage to obtain the second duty cycle.

12. The cooperative control method according to claim 3, wherein the calculating the duty cycle of each phase bridge arm in the reversible PWM rectifier according to the target quadrature axis current, the target direct axis current, the target charging and discharging current, the sampling current value on each phase coil, and the motor rotor position comprises:
acquiring a target current value of each phase coil according to the target quadrature axis current, the target direct axis current, the motor rotor position, and the target charging and discharging current;
acquiring a reference voltage of each phase bridge arm according to the sampling current value on each phase coil and the target current value of each phase coil; and
acquiring the duty cycle of each phase bridge arm according to the reference voltage of each phase bridge arm.

13. The cooperative control method according to claim 12, wherein the acquiring a target current value of each phase coil according to the target quadrature axis current, the target direct axis current, the motor rotor position, and the target charging and discharging current comprises:
performing a linear transformation on the target charging and discharging current to acquire a target zero-axis current of each set of windings, and performing inverse Park coordinate transformation and inverse Clark coordinate transformation according to the target quadrature axis current, the target direct axis current, the motor rotor position, and the target zero-axis current, to acquire the target current value of each phase coil.

14. The cooperative control method according to claim 3, wherein the calculating the duty cycle of each phase bridge arm in the reversible PWM rectifier according to the target quadrature axis current, the target direct axis current, the target charging and discharging current, the sampling current value on each phase coil, and the motor rotor position comprises:
acquiring a target α-axis current and a target β-axis current of a stationary reference frame according to the target quadrature axis current, the target direct axis current, and the motor rotor position;
acquiring an actual zero-axis current of each set of windings according to the sampling current value on each phase coil, and acquiring an actual α-axis current and an actual ß-axis current of the meter stationary reference frame according to the sampling current value on each phase coil;
acquiring a reference voltage of the motor coil in the stationary reference frame according to the target α-axis current, the target β-axis current, the actual α-axis current, and the actual ß-axis current;
performing space vector pulse width modulation on the reference voltage of the stationary reference frame to obtain a first duty cycle of each phase bridge arm;
acquiring a voltage regulation value of each phase bridge arm according to the target charging and discharging current and the actual zero-axis current, and modulating the voltage regulation value and a bus voltage to obtain a second duty cycle; and
calculating the duty cycle of each phase bridge arm according to the first duty cycle of each phase bridge arm and the second duty cycle of each phase bridge arm.

15. The cooperative control method according to claim 1, further comprising:
- acquiring a resultant current vector amplitude according to the target quadrature axis current and the target direct axis current that correspond to a first target driving power, when the target driving power is converted from the first target driving power to a second target driving power;
- acquiring first intersection coordinates and second intersection coordinates formed by a circle having a center of an original point in a predetermined torque graph and a radius of the resultant current vector amplitude and a torque curve corresponding to the second target driving power;
- acquiring a first distance between the first intersection coordinates and a coordinate point formed by the target quadrature axis current and the target direct axis current, and a second distance between the second intersection coordinates and the coordinate point formed by the target quadrature axis current and the target direct axis current; and
- when the first distance is smaller than the second distance, determining the first intersection coordinates corresponding the first distance as a target direct axis current and a target quadrature axis current of the second target driving power, and when the second distance is smaller than the first distance, determining the second intersection coordinates corresponding to the second distance as the target direct axis current and the target quadrature axis current of the second target driving power.

16. A non-transitory computer-readable storage medium, storing a computer program which contains a cooperative control method for an energy conversion apparatus, the energy conversion apparatus comprises a reversible pulse width modulation (PWM) rectifier and a motor coil; the reversible PWM rectifier is connected with the motor coil; a positive electrode end and a negative electrode end of an external battery are respectively connected with a first bus terminal and a second bus terminal of the reversible PWM rectifier; a first end and a second end of an external charging and discharging port are respectively connected with at least one neutral line led out from the motor coil and the second bus terminal of the reversible PWM rectifier, wherein when the computer program is executed by a processor,
the cooperative control method comprises:
- acquiring a target heating power, a target driving power, and a target charging and discharging power;
- acquiring, according to the target charging and discharging power, a target charging and discharging current outputted from the external charging and discharging port the neutral line, and acquiring a first heating power of the motor coil according to the target charging and discharging current;
- acquiring, according to the target driving power, a first quadrature axis current and a first direct axis current in a synchronous rotating reference frame based on motor rotor field orientation, and acquiring a second heating power of the motor coil according to the first quadrature axis current and the first direct axis current;
- adjusting the first quadrature axis current and the first direct axis current to a target quadrature axis current and a target direct axis current according to the target driving power, such that a difference between a sum of the first heating power and the second heating power and the target heating power to be within a preset range; and
- acquiring a sampling current value on each phase coil and a motor rotor position, and calculating a duty cycle of each phase bridge arm in the reversible PWM rectifier according to the target quadrature axis current, the target direct axis current, the target charging and discharging current, the sampling current value on the each phase coil, and the motor rotor position.

17. A vehicle, comprising a cooperative control apparatus for an energy conversion apparatus, wherein the energy conversion apparatus comprises a reversible pulse width modulation (PWM) rectifier and a motor coil; the reversible PWM rectifier is connected with the motor coil; a positive electrode end and a negative electrode end of an external battery are respectively connected with a first bus terminal and a second bus terminal of the reversible PWM rectifier; a first end and a second end of an external charging and discharging port are respectively connected with at least one neutral line led out from the motor coil and the second bus terminal of the reversible PWM rectifier; and
the cooperative control apparatus comprises a memory storing a computer program and a processor, wherein when the computer program is executed by the processor causes the processor to perform operations comprising:
- acquiring a target heating power, a target driving power, and a target charging and discharging power;
- acquiring, according to the target charging and discharging power, a target charging and discharging current outputted by the external charging and discharging port, and acquiring a first heating power of the motor coil according to the target charging and discharging current;
- acquiring, according to the target driving power, a first quadrature axis current and a first direct axis current in a synchronous rotating reference frame based on a motor rotor field orientation, and acquiring a second heating power of the motor coil according to the first quadrature axis current and the first direct axis current;
- respectively adjusting the first quadrature axis current and the first direct axis current to a target quadrature axis current and a target direct axis current according to the target driving power, such that a difference between a sum of the first heating power and the second heating power and the target heating power is within a preset range, and respectively setting the first quadrature axis current and the first direct axis current as the target quadrature axis current and the target direct axis current, when the difference between the sum of the first heating power and the second heating power and the target heating power is within the preset range; and
- acquiring a sampling current value on each phase coil and a motor rotor position, and calculating a duty cycle of each phase bridge arm in the reversible PWM rectifier according to the target quadrature axis current, the target direct axis current, the target charging and discharging current, the sampling current value on each phase coil, and the motor rotor position.

* * * * *